(12) United States Patent
King et al.

(10) Patent No.: US 11,575,512 B2
(45) Date of Patent: Feb. 7, 2023

(54) CONFIGURABLE NETWORK SECURITY FOR NETWORKED ENERGY RESOURCES, AND ASSOCIATED SYSTEMS AND METHODS

(71) Applicant: Operant Networks, Santa Rosa, CA (US)

(72) Inventors: Randall King, Santa Rosa, CA (US); Roger L. Jungerman, Petaluma, CA (US); Mayank Saxena, Pleasanton, CA (US)

(73) Assignee: OPERANT NETWORKS, Santa Rosa, CA (US)

(*) Notice: Subject to any disclaimer, the term of this patent is extended or adjusted under 35 U.S.C. 154(b) by 3 days.

(21) Appl. No.: 17/390,726

(22) Filed: Jul. 30, 2021

(65) Prior Publication Data

US 2022/0038281 A1 Feb. 3, 2022

Related U.S. Application Data

(60) Provisional application No. 63/059,876, filed on Jul. 31, 2020.

(51) Int. Cl.
*H04L 9/40* (2022.01)
*H04L 9/32* (2006.01)
*H04L 9/08* (2006.01)
*H04L 9/30* (2006.01)
*H04L 9/00* (2022.01)

(52) U.S. Cl.
CPC ............. *H04L 9/321* (2013.01); *H04L 9/003* (2013.01); *H04L 9/0819* (2013.01); *H04L 9/30* (2013.01); *H04L 9/3265* (2013.01); *H04L 63/0263* (2013.01); *H04L 63/0823* (2013.01); *H04L 63/101* (2013.01); *H04L 63/20* (2013.01)

(58) Field of Classification Search
CPC ..... H04L 9/0819; H04L 9/321; H04L 9/3265; H04L 63/0823; H04L 63/20; H04L 67/104; H04L 67/12; H04L 67/125
See application file for complete search history.

(56) References Cited

U.S. PATENT DOCUMENTS

| | | | |
|---|---|---|---|
| 7,904,642 B1 * | 3/2011 | Gupta | G06F 16/90339 711/108 |
| 9,270,701 B1 * | 2/2016 | Lamb | H04L 63/20 |
| 9,426,124 B2 * | 8/2016 | Pope | H04L 63/0236 |
| 9,680,875 B2 * | 6/2017 | Knjazihhin | H04L 63/20 |

(Continued)

OTHER PUBLICATIONS

Horowitz et al., "An Overview of Distributed Energy Resource (DER) Interconnection: Current Practices and Emerging Solutions" [Online], Apr. 2019, [Retrieved on: Sep. 14, 2022], NREL, Retrieved from: <https://www.nrel.gov/docs/fy19osti/72102.pdf> (Year: 2019).*

(Continued)

*Primary Examiner* — Eric W Shepperd
(74) *Attorney, Agent, or Firm* — Perkins Coie LLP

(57) ABSTRACT

Secure communication between users and resources of an electrical infrastructure and associated systems and methods. A representative secure distributed energy resource (DER) communication system provides for the creation of trust rules that govern the permitted communications between users and resources of an electrical infrastructure system, and the enforcement of the trust rules.

17 Claims, 12 Drawing Sheets

(56) References Cited

U.S. PATENT DOCUMENTS

| | | | | |
|---|---|---|---|---|
| 10,305,864 | B2* | 5/2019 | Wood | H04L 9/0816 |
| 10,389,757 | B2* | 8/2019 | Kumar | H04L 63/0263 |
| 2013/0124546 | A1* | 5/2013 | Wormley | G06F 16/27 |
| | | | | 707/E17.014 |
| 2013/0227166 | A1* | 8/2013 | Ravindran | H04L 67/566 |
| | | | | 709/238 |
| 2014/0053228 | A1* | 2/2014 | Mahadevan | G06F 16/176 |
| | | | | 726/1 |
| 2016/0119234 | A1* | 4/2016 | Valencia Lopez | H04L 45/745 |
| | | | | 370/401 |
| 2017/0371718 | A1* | 12/2017 | Ko | G06F 9/5044 |
| 2018/0083921 | A1* | 3/2018 | Talamo | H04L 63/0263 |
| 2018/0191514 | A1* | 7/2018 | Erdmann | H04L 12/2803 |
| 2020/0027022 | A1* | 1/2020 | Jha | H04L 67/10 |
| 2020/0162270 | A1* | 5/2020 | Du | H04L 63/0428 |
| 2021/0021609 | A1* | 1/2021 | Smith | G06F 8/60 |
| 2021/0029174 | A1* | 1/2021 | Kunduru | H04L 63/20 |

OTHER PUBLICATIONS

"Publisher-Subscriber pattern" [Online], filed with IDS Jul. 26, 2022, originally retrieved from: < https://learn.microsoft.com/en-us/azure/architecture/patterns/publisher-subscriber > (Year: 2022).*

SANS Industrial Control Systems and E-ISAC, "Analysis of the Cyber Attack on the Ukrainian Power Grid—Defense Use Case," Mar. 18, 2016, 29 pages.

Wikipedia, 2019 California power shutoffs, https://en.wikipedia.org/wiki/2019_California_power_shutoffs, retrieved on Jul. 24, 2022.

"4 Major IoT Protocols—MQTT, CoAP, AMQP, DDS", Dec. 5, 2018, 5 pages.

"ITRON, Advanced Meter Infrastructure", Transforming Meter Systems Today . . . and Tomorrow 9 pages.

"MODBUS and DNP3 Communication Protocols", Triangle Micro Works, Inc. 4 pages.

"Wikipedia", Information-centric networking, Jun. 25, 2021, 1 page.

Boneh, Dan, et al., "BLS Multi-Signatures With Public-Key Aggregation", Stanford University, Mar. 24, 2018, 6 pages.

Boneh, Dan, et al., "Short Group Signatures", Advances in Cryptology—CRYPTO 2004, Springer-Verlag, 19 pages.

Conran, Matt, "Named data networking: Stateful forwarding plane for datagram delivery", networkworld.com/article/3342212/named-data-networking-stateful-forwarding-plane-for-datagram-delivery.htmlIDG Communications, Inc., 2019, 5 pages.

Conti, Mauro, et al., "The Road Ahead for Networking: A Survey on ICN-IP Coexistence Solutions", University of Padua, Oct. 15, 2019, https://named-data.net/ndn-testbed/.

Lai, Christine, et al., "Cyber Security Primer for Der Ventors, Aggregators, and Grid Operators", Sandia Report, Sandia National Laboratories, Dec. 2017, 63 pages.

Nichols, Kathleen, "Lessons Learned Building a Secure Network Measurement Framework using Basic NDN", Pollere, Inc., Sep. 24-26, 2019, 11 pages.

Pollere, DCT , "Definted-trust Communications Toolkit (DCT)", Pollere LLC, 2021-2022, 3 pages.

Shang, Wentao, et al., "Publish-Subscribe Communication in Building Management Systems over Named Data Networking", NDN, Technical Report NDN-0066, 2018. http://named-data.net/techreports.html, 11 pages.

Yu, Yingdi, "Public Key Management in Named Data Networking", NDN, Technical Report NDN-0029, 2015. http://named-data.net/techreports.html, Apr. 20, 2015, 8 pages.

Yu, Yingdi, et al., "Schematizing Trust in Named Data Networking", Oct. 30-Oct. 2, 2015, pp. 177-186, http://dx.doi.org/10.1145/2810156.2810170.

Zhang, Zhiyi, et al., "An Overview of Security Support in Named Data Networking", Information-Centric Networking Security, IEEE, Nov. 2018, pp. 62-68.

* cited by examiner

Roles (for certificates)

Origin

| Example Sender Identity (name of signing key pair) | Trust Schema Role | Name of certicficate (contains trust schema role) | Certifiicate CA Signer (name of trust console authority) | Notes |
|---|---|---|---|---|
| Cindy_Cox | Subject/Controller | Subject/Controller/Cindy_Cox | Console/Personnel/Admin | Personnel Admin delegates Assistant to |
| Dan Duff | Subject/DER Viewer | Subject/DER Viewer/Dan_Duff | Console/Personnel/Admin/Assistant | authorize users for DER Viewer only using |

Target

| Example Receiver identity (name of signing key pair) | Trust Schema Role | Name of certicficate (contains trust schema role) | Certificate CA Signer (name of trust console authority) | Notes |
|---|---|---|---|---|
| Plant1 | Device/Nuclear | Device/Nuclear/Plant1 | Console/Device/Admin | Console Device Admin delegates |
| ID_14325 | Device/Solar/DER | Device/Solar/DER/ID_14325 | Console/Device/Admin/Assistant | Assistant to authorize new DER |

Trust Rules

Origin Enforcement Point

| message | type | Target | Roles | | Notes |
|---|---|---|---|---|---|
| | | | Controller | Viewer | |
| request_reading/daily energy/ | Request | Nuclear | OK | X | Only Controller can send request to Nuclear plant |
| | | DER | OK | OK | Both Controller Viewer can send request to DER plant |
| | | | Nuclear | DER | |
| current_value/daily energy/ | Response | Controller | OK | OK | Both DER and Nuclear can send reading to Controller |
| | | Viewer | X | OK | Nuclear is blocked from sending reading to Viewer |

Target Enforcement Point

| message | type | Origin | Roles | | Notes |
|---|---|---|---|---|---|
| | | | Nuclear | DER | |
| request_reading/daily energy/ | Request | Controller | OK | OK | Both plants can process request from Controller |
| | | Viewer | X | OK | Nuclear blocked from processing request from Viewer |
| | | | Controller | Viewer | |
| current_value/daily energy/ | Response | Nuclear | OK | X | Viewer blocked from receiving reading from Nuclear |
| | | DER | OK | OK | Both Controller and Viewerr can be receive DER reading |

*FIG. 4*

CONFIGURABLE NETWORK SECURITY FOR NETWORKED ENERGY RESOURCES, AND ASSOCIATED SYSTEMS AND METHODS

CROSS-REFERENCE TO RELATED APPLICATION(S)

This application claims the benefit of priority to U.S. Provisional Application No. 63/059,876 filed on Jul. 31, 2020, which is hereby incorporated by reference in its entirety.

TECHNICAL FIELD

The present technology is directed generally to securing access, for one or more users, to distributed energy resources and other networked energy resources, and associated systems and methods.

BACKGROUND

The electrical infrastructure is becoming increasingly decentralized and fragmented with the introduction of distributed energy resources (DERs), such as photovoltaic (PV) inverters, energy storage systems (ESS), and micro-grids. With this trend towards decentralization, electrical infrastructure owners may increasingly contract with other DER aggregators, or even individual DER system owners, to supply power and grid services. Often, each of these providers may utilize their own network communications methods, with multiple points of contact for vital grid support services such as frequency control, and each presents potential cyber-attack points. However complex business relationships between these different entities (e.g., infrastructure owners, DER aggregators, DER system owners, etc.) typically require that the control of various system components, such as PV inverters, be granted to multiple parties in different organizations or companies. Even when control of a resource is not being granted to another entity, other entities may nonetheless need to communicate with the resource (e.g., to determine the status of the resource, such as a PV inverter). In other words, the demand for communications between different resources in an electrical infrastructure system, and the various entities that own or manage those resources, is increasing.

The communication technologies typically used by electrical infrastructure systems to satisfy the communication demands among entities and DERs, as well as other networked electrical power generation load control and storage resources (NEPGLSRs), suffer from various shortcomings. For example, the conventionally used communication technologies can be susceptible to distributed denial of service (DDoS) attacks, malware, ransomware, data theft, as well as other internet-based attacks.

It would therefore be advantageous to enable secure communication between various entities and resources within an electrical infrastructure system.

BRIEF DESCRIPTION OF THE DRAWINGS

FIG. 4 is an illustration of representative trust rules and certificates, used in a secure DER communication system, in accordance with representative embodiments of the present technology.

Figure 1:
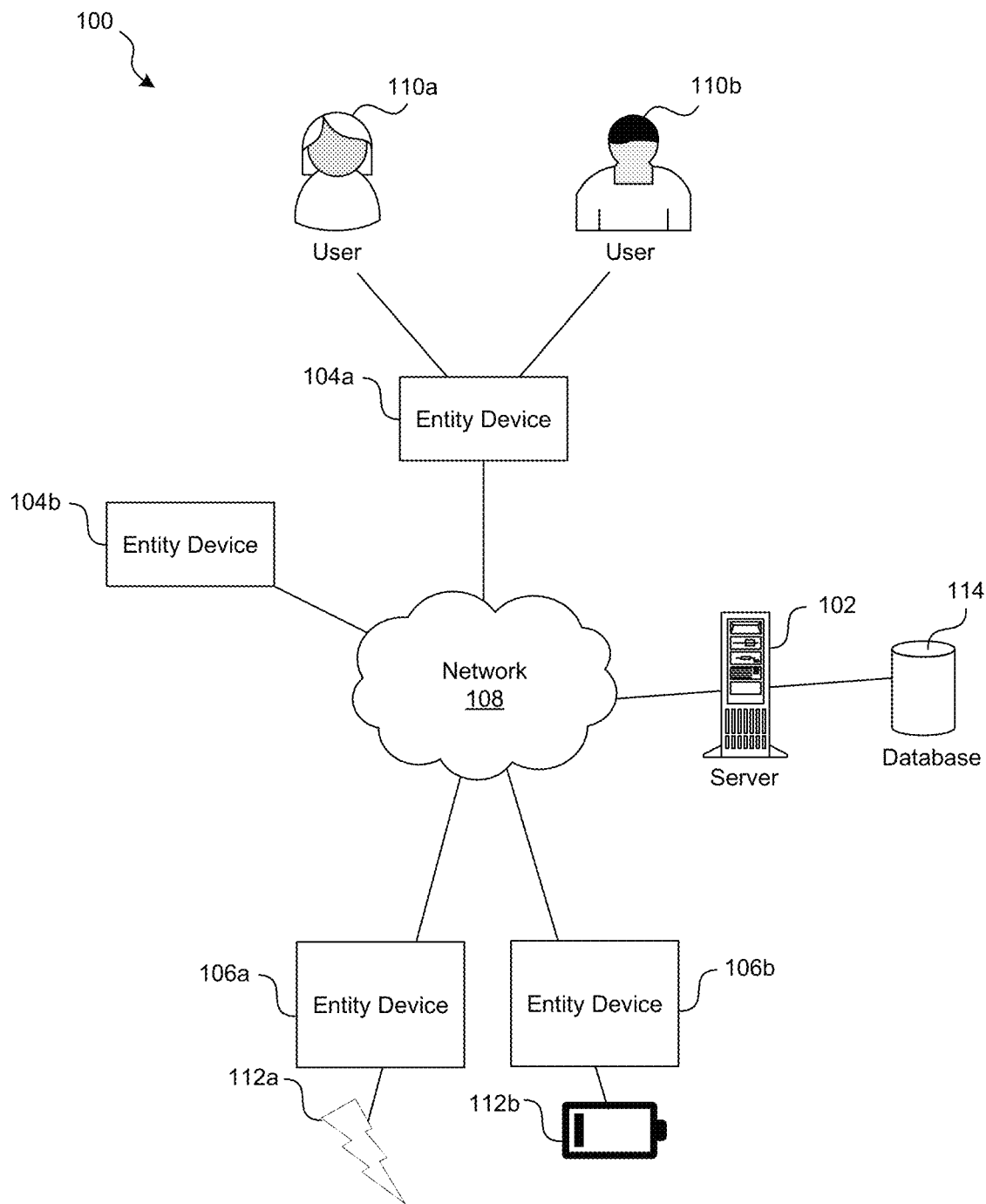
FIG. 1 is a network diagram illustrating a representative computing environment in which a secure DER communication system can operate.

In the present disclosure, the drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in greater detail below. The intention, however, is not to limit the technology to the particular implementations described. On the contrary, the technology is intended to cover all suitable modifications, equivalents, and alternatives.

DETAILED DESCRIPTION

Systems that enable secure communication between various users and distributed energy resources (DERs), as well as between other networked electrical power generation load control and storage resources (NEPGLSRs), within an electrical infrastructure system (a "secure DER communication system"), are described herein. In some embodiments, the secure DER communication system can be deployed by an infrastructure provider (e.g., an electric utility, a water utility, a gas utility, or other provider of utility services), and used to facilitate secure communication between the infrastructure provider, infrastructure resources (e.g., DERs), and various users and/or stakeholders (e.g., DER vendors, DER technicians, customers of the infrastructure provider, and other end users). As used herein, both resources (e.g., DERs and NEPGLSRs) and users (e.g., administrators, customers, vendors, etc.) are characterized as entities within the infrastructure and of the secure DER communication system.

In some embodiments, the secure DER communication system includes an administrative console (a "trust console"), through which an infrastructure provider or other entity with administrative privileges can manage the secure DER communication system. As described herein, the trust console provides the ability for the infrastructure provider or other administrator to define the security rights, through one or more trust rules that collectively form a trust schema, of entities attempting to communicate with other entities (e.g., between users and/or DERs). The trust console can additionally enable the utility provider to grant DER access to the multiple entities without broadly exposing the utility provider's network to those multiple entities or other third parties.

In some embodiments of the secure DER communication system, the system (and/or the trust console) employs Information Centric Networking (ICN). As described herein there are numerous variations of ICN that can be used in some embodiments of the secure DER communication system, such as Named Data Networking (NDN). NDN security, NDN key distribution, NDN trust rules, and NDN publish/subscribe mechanisms have been described in the academic literature. However, the use of these NDN features in an electrical infrastructure control application, as well as other business-level applications, is not currently known. As described herein, the trust console of the secure DER communication system advantageous utilizes NDN, which helps to properly configure and distribute keys and trust rules, which should be performed correctly to ensure adequate security.

As described herein, an advantage of NDN is its ability to make cryptographic keys securely and resiliently available. By utilizing NDN, the secure DER communication system can generate these NDN keys with application-meaningful hierarchical names (like all named data) and thus they can be managed in a straightforward manner. There is currently no convenient way for users to invent and organize the critical namespaces that enable NDN. The secure DER communication system and trust console, however, provides a unifying mechanism for the user to initially construct, review, and then extend the namespaces. A built-in consistency checker enables the trust console to identify and highlight names which are malformed or inconsistently structured, much like the spell checker and grammar review functions built in to word processing software. In some embodiments of the secure DER communication system, each NDN name component will be checked to see if it exists in the current lexicon and, if not, be flagged for the user to either explicitly add it or modify it to conform.

Another aspect of the secure DER communication system is that keys are authorized and distributed as NDN data packets, with a trust chain starting with a root key certificate which is established by an outside secure mechanism. Each authorized key can have unique trust rules which govern the access allowed (which may be more restrictive than the root key access) as controlled by the trust console, and can also specify if a subordinate authorized user is further allowed to issue keys further down in the key hierarchy.

In some embodiments of the secure DER communication system, the trust console can use NDN to enable consistent and simplified communication among entities (e.g., users and/or resources) operating in any of several types of infrastructure environments, including several types of communication architectures. For example, and as described further herein, the trust console can secure communication over existing and developing standards for control of infrastructure assets (e.g., Institute of Electrical and Electronics Engineers (IEEE) 2030.5, Distributed Network Protocol 3 (DNP3) and modbus), over emerging communication technologies (e.g., wireless mesh applications), and over the Internet.

It will be appreciated that trust schema, used to define the types of privileges given to entities in an electrical infrastructure system, can be quite complex and difficult to construct accurately. For example, supporting granular control of DERs within the electrical infrastructure system can necessitate thousands of possible commands and queries. As a further example, the entities with the electrical infrastructure system that need to communicate with the DERs can have within them a large number of individuals and roles, all of whom need to have their access privileges defined. As a still further example, levels of access can be dynamic; some accesses should be limited in timespan and/or conditioned on system status. The extent of these challenges is expected to grow, as the number of DERs is expected to grow significantly in the future. The trust console can help to overcome these challenges by advantageously automating and simplifying the management of secure communication, using trust rules, within an electrical infrastructure system. Furthermore, an advantage of the trust console is it defines meta-rules which uniquely specify the ability to extend and deploy new trust schemas by utilizing the already present NDN trust mechanisms. This allows the trust system to organically evolve to meet the changing needs of business organizations over time.

As described herein, by utilizing NDN in an infrastructure resource communication environment, the secure DER communication system provides various security and architectural improvements. Said integration can help to overcome various shortcomings in conventional communications infrastructure, particularly when attempting to manage the added complexity of DER.

As used herein, the term DER can refer to any distributed energy generation resource, including energy generation via solar, wind, hydro, etc. DER can additionally refer to an energy consumer (e.g., load control) and/or energy storage (e.g., battery storage). Such resources can be at the scale of a utility, commercial, or residential system. Although the secure DER communication system is described generally in the context of securing communications with DERs, the system can also be used to manage communication with NEPGLSRs. Examples of NEPGLSRs include gas peaker plants, nuclear power plants, utility fossil fueled generation facilities, and geothermal generating plants. The secure DER communication system can additionally be used to secure communication with infrastructure resources that do not generate electrical power, such as water purification and distribution systems; gas infrastructure, pipeline and distribution systems; and industrial control systems (e.g., food processing and chemical systems). As a still further example, resources managed by the secure DER communication system can include batteries, car chargers, home thermostats, and the like. More generally, the secure DER communication system can be used to secure communication between networked resources (NRs), which can include DERs, NEPGLSRs, and other examples of resources described herein.

While the secure DER communication system is described primarily in the context of using NDN, it will be appreciated that the system can utilize other communication architectures. More generally, the secure DER communication system can utilize any suitable form of Information Centric Networking (ICN), such as Content Centric Networking (CCN), Mobility First, eXtensible Internet Architecture (XIA), and others.

In some embodiments of the secure DER communication system, the trust console can utilize the Versatile Security (VerSec) trust language. Versec provides a simple, general framework for constructing self-consistent, validatable names. The schema description language describes constraints on both the layout and components of names and on the structural and signing relationships between names. It is a referentially transparent, declarative language like Prolog or Datalog, based on Unification and Resolution. Its statements simply state facts that can be given in any order. Only when it has all the facts does the compiler analyze them to determine if they are consistent, complete and verifiable.

It will be appreciated that certain standards and/or regulations, such as International Electrotechnical Commission (IEC) 61850 (through access control rules defined in IEC 61531-8) have articulated detailed requirements for DER and other electrical infrastructure systems. The resulting semantic access model can be converted to provide a precise definition of business appropriate trust requirements. However up to now effective mechanisms for implementing these rules have been lacking. As described herein, the secure DER communication system and trust console can enable an efficient NDN implementation using VerSec trust schemas. In some embodiments, where these rules are fully defined they can be directly imported into the Trust console, using their eXtensible Access Control Markup Language (XACML) control policy description, and optionally modified.

Various implementations of the system will now be described. The following description provides specific details for a thorough understanding and an enabling description of these implementations. One skilled in the art will understand, however, that the system can be practiced without many of these details and/or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system.

Suitable Environments

FIG. 1 is a network diagram illustrating a representative computing environment 100 in which a secure DER communication system operates. Although not required, aspects of the system are described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the system can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., electrically erasable programmable read-only memory (EEPROM) chips). Alternatively, aspects of the system may be distributed electronically over the Internet or over other networks (including wireless networks). Those skilled in the relevant art will recognize that portions of the system may reside on a server computer, while corresponding portions reside on a client computer.

The environment 100 includes server computers 102 ("servers"), a plurality of entity devices 104*a-n* and 106*a-n*, which communicate with each other through a network 108. The network 108 can be, for example, a LAN or WAN, and can include wired and/or wireless network elements. In some embodiments, and as described herein, the network 108 is the Internet or some other combination of other public and/or private network.

Severs 102 operate a secure DER communication system, which enables resources of an infrastructure system to securely communicate with users associated with the infrastructure system. For example, servers 102 can be associated with or managed by an energy infrastructure provider, and the secure DER communication system can be used to manage communication between resources deployed by the infrastructure provider (e.g., energy generation resources and energy storage resources) and users associated with the energy infrastructure (e.g., the infrastructure provider, resource vendors, resource technicians, home and commercial customers, etc.).

The entity devices 104*a-n* are computing devices operated by or otherwise associated with entities corresponding to different users of an electrical infrastructure system. As used herein, an entity can refer to any organization, business, enterprise, residence, etc. that may communicate with resources within the electrical infrastructure system. Examples of entities include the infrastructure provider, resource vendors, resource technicians, and customers of the infrastructure provider. Furthermore, each entity can be associated with one or more users 110*a-n*. For example, the infrastructure provider can have a user 110*a* corresponding to a particular engineer associated with the infrastructure provider, and a user 110*b* corresponding to a particular system administrator associated with the infrastructure provider. As described further herein, the particular users 110a-n, as well as the roles with which they are associated (e.g., engineer, system administrator, etc.) can be represented by entities within the secure DER communication system. As described further herein, each entity (whether an organization, an individual user, or a role) can be associated with a name defined in an NDN hierarchical namespace. Although only entity devices 104a and 104b are illustrated in FIG. 1, it will be appreciated any arbitrary large number of entity devices can be found in the electrical infrastructure systems.

The entity devices 106a-n are computing devices operated by or otherwise associated with entities corresponding to different resources 112a-n within the electrical infrastructure systems. As used herein, a resource can refer to a DER, a NEPGLSR, or other infrastructure resource. For example, the entity device 106a can be associated with a power generation resource 112a, such as a solar array, a wind farm, or a nuclear power plant. As a further example, the entity device 106b can be associated with a power storage resource 112b, such as battery storage. As described further herein, each resource can be associated with a name defined in an NDN hierarchical namespace. Although only entity devices 106a and 106b are illustrated in FIG. 1, it will be appreciated any arbitrary large number of entity devices can be found in the electrical infrastructure systems.

For an electrical infrastructure system to operate, components of the electrical infrastructure system (e.g., different entities corresponding to users and resources) need to be able to communicate with each other. For example, a remote technician (corresponding to one of users 110a-n) may need to obtain the operating status of various energy-producing resources and/or deploy a software update to an energy-storing resource (corresponding to one of resources 112a-n). As a further example, a resource may need to alert multiple entities of a change in its operating status. With the proliferation of DERs, and other networked resources that are often geographically distributed, these communication needs grows. As described further herein, the secure DER communication system, operating in part on servers 102, enables secure communication between the computing systems associated with these entities (e.g., entity devices 104a-n and 106a-n), over the network 108, using NDN messages.

In some embodiments of the secure DER communication system, a computing device associated with an entity of the electrical infrastructure system (e.g., entity devices 104a-n or 106a-n) generates an NDN message when it attempts to communicate with another entity of the electrical infrastructure system. The generated NDN message can include information such as the entities for which the NDN message is intended (e.g., the message targets), and the requested action of the message targets (e.g., a request for status, an instruction to change an operating parameter, a command to deploy a software update, etc.). The NDN message can also be associated with the identifier of the computing device that generates the message (e.g., the message origin). In some embodiments the message origin and/or message target identify a device (e.g., entity devices 104a-n and/or 106a-n) using a name defined in a NDN hierarchical namespace. Furthermore, messaging can be two-directional. That is, an entity device 104a-n and/or 106a-n can be the origin of a first message, and be a target of a second message. For example, an entity (e.g., one of entity device 104a-n or 106a-n) can originate a message requesting the status of a DER, and then be the target of a status response from the DER.

In some embodiments of the secure DER communication system, generated NDN messages (e.g., an access request generated by an origin computing system, such as one of entity devices 104a-n and/or 106a-n) are published to the network 108. Similarly, devices (e.g., entity devices 104a-n and/or 106a-n) may subscribe to certain messages. In other words, the secure DER communication system can employ a publication/subscription architecture to communicate NDN message.

To manage whether access requests (e.g., a request of a resource to report its status) are permitted, the secure DER communication system can include a trust console, which can operate on servers 102. As described further herein, certain privileged users (e.g., system administrators associated with an infrastructure provider) can author trust rules, which define the scope of privileges of infrastructure components. For example, a particular trust rule can define the set of actions that a particular entity can request of another particular entity (e.g., one user over one resource). The set of trust rules defining the permissions of the infrastructure system is referred to collectively as the trust schema. In some embodiments the trust rules and/or trust schema are maintained in database 114. Trust rules and/or trust schema can be published to the network 108 as NDN messages. As described herein, enforcement points of the secure DER communication system, which subscribe to or otherwise receive the trust rules via NDN messages, can use the trust rules to evaluate whether access requests are permitted.

In some embodiments, entity devices 104a-n and/or 106a-n function as enforcement points. That is, and as described further herein, the devices can evaluate whether an access request is permitted based on trust rules of the system. In some embodiments enforcement occurs at the publication and/or subscription of an access message. For example, if an user is making a request of a resource, the user's corresponding entity device can operate as a publish enforcement point and/or the resource's corresponding entity device can operate as a subscribe enforcement point. Furthermore, a device that operates an enforcement point of one type (e.g., publish or subscribe) for a first message can operate as an enforcement point of the other type for a second message. That is, continuing from the example above, if the resource generates an access request its corresponding entity device can operate as a publish enforcement point, and the devices of any targets can operate as subscribe enforcement points.

The secure DER communication system can apply NDN in different infrastructure embodiments in a consistent way, simplifying user configuration and allowing seamless migration to enhanced network capability. That is, the secure DER communication system can be deployed where network 108 corresponds to one or more different types of computer networks.

For example, existing and emerging standards for systematic control of distributed infrastructure assets, such as IEEE 2030.5, DNP3 and modbus may have some limited internal security features. The secure DER communication system can maintain required compliance with these standards, while providing advantageous fine grained NDN business-level security controls. The trust console, as sole point of control, properly configures the internal security in the standard, while providing redundant but very granular control of NDN trust, which is consistent with but beyond the capabilities of the native standard. As a second example of emerging standards, IEC 61850 specifies the control of utility assets, including DER, storage devices, and utility substations. IEC 62351-8 gives detailed semantic role-based access control (RBAC) models for these assets. The secure DER communication system and the trust console can be used to efficiently apply these trust rules using a VerSec publish/subscribe (pub/sub) architecture, and securely control assets over common legacy communications protocols, such as DNP3 as defined by MESA standards to overcome their lack of intrinsic security features.

As a second example, for future emerging systems, NDN trust and security can be used exclusively. This allows for a more streamlined implementation that has fast response times and can for example be used beyond current point-to-point network topologies, such as in low-cost wireless mesh applications or in publication/subscriber architectures, and to improve network resilience and extend the application to lightweight IoT devices. Software upgrades, which are signed and encrypted and can be distributed over NDN.

As a third example, to address current infrastructure and needs the secure DER communication system and trust console can control permissions and trust for gating general purpose Internet connections to infrastructure assets, including configuring firewalls and virtual private network (VPN). This is typically required for maintenance as specified by an infrastructure provider, including software upgrades. Such novel security control is not currently available, and infrastructure providers are dependent on best security practices by infrastructure equipment vendors, which is out of the provider's control. The simultaneous support of uniform trust policies for all three architectures allows the immediate application of enhanced cybersecurity and access control to existing utility communications networks.

Message Flow of a Secure DER Communication System

Figure 2:
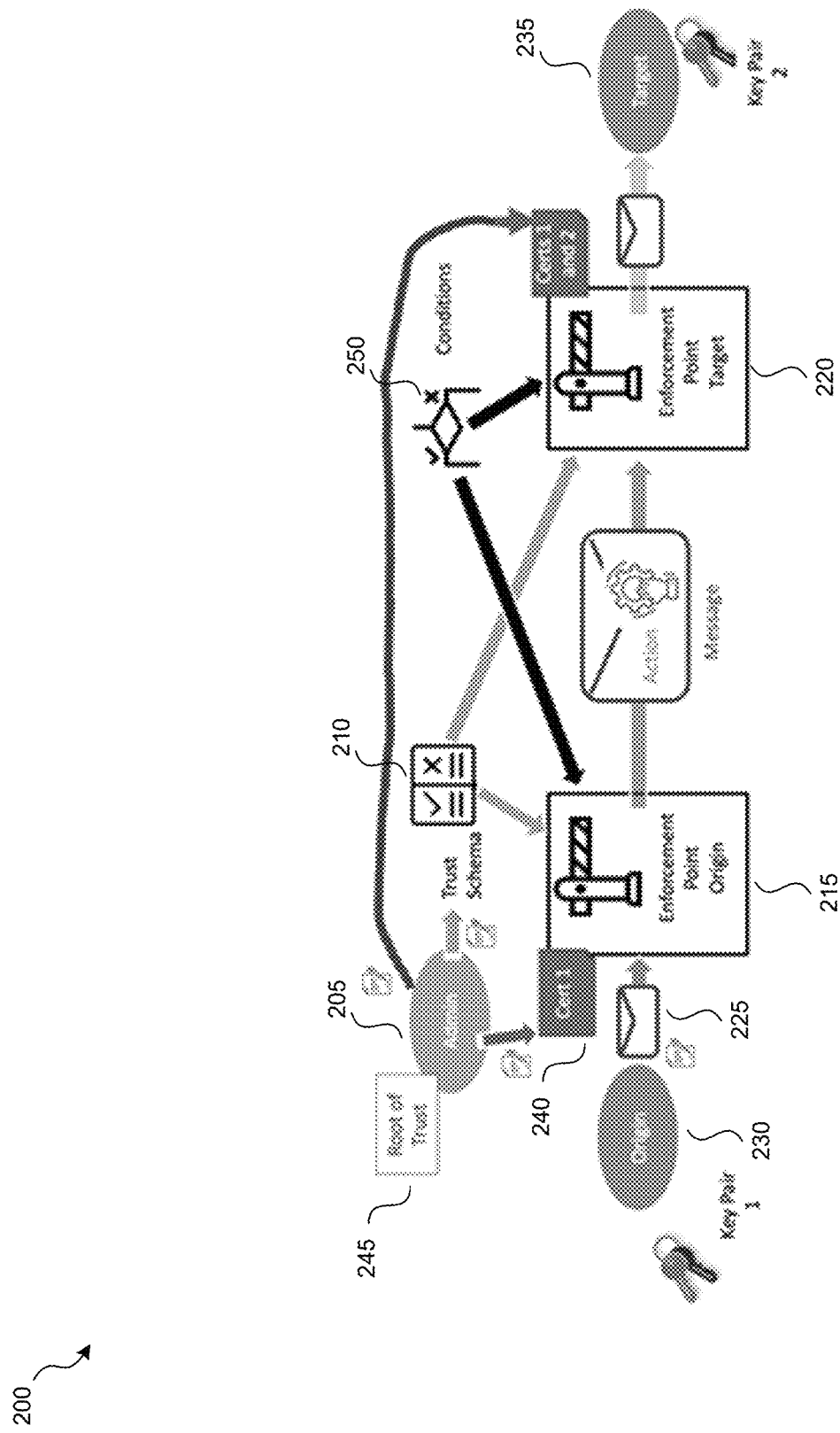
FIG. 2 is a schematic illustration of a representative message flow managed by a secure DER communication system, in accordance with representative embodiments of the present technology.

FIG. 2 is a schematic illustration of a representative message flow 200 managed by a secure DER communication system. As described herein, the message flow 200 illustrates how a trust schema is authored through the secure DER communication system, and how the trust schema and other information is distributed through the secure DER communication system to secure communication between infrastructure entity (e.g., users and/or resources).

Through an administrative system of the secure DER communication system, for example a trust console 205, users with sufficient permissions can manage (e.g., generate, delete, edit, publish, etc.) a trust schema 210. The trust schema 210 comprises a plurality of trust rules, each of which is a rule triad comprising an origin, action, and target. A trust rule characterizes what actions the origin can instruct to be performed on the target. As described herein, the origin and/or target of a trust rule can correspond to any entity (e.g., user and/or resource) of the infrastructure system. Individual trust rules can optionally be subject to a condition of the infrastructure system.

Permitted users can interface with the administrative trust console 205 through a graphical user interface (GUI) or through an application programming interface (API). The permitted users can create entity groups using the trust console and can export the groups, and/or origin and target groups can be managed on a separate Lightweight Directory Access Protocol (LDAP) or other access control system, such as Microsoft Active Directory. The access systems, in addition to organizing the entities (for example, users) into groups or roles, can also supply authentication and log-in services, including two-factor or biometric authentication for security. Similarly, the resources (for example, utility equipment or end-equipment communications gateways) can use an embedded cryptographic ID chip for authentication. In some embodiments, trust rules and policies can be imported into or exported from the Trust Console in binary, XACML text (Extensible Markup Language-based (XML-based)), or VerSec binary rules, where they can be applied or modified. Other forms can also be employed.

The trust schema 210, and/or additional trust information maintained by the trust console 205, can be transmitted (e.g., sent and/or published) over the secure DER communication system using NDN. In some embodiments the entirety of the trust schema 210 is transmitted. In some embodiments portions of the trust schema 210 (e.g., individual trust rules) are transmitted. Transmission of the trust schema 210 can be performed periodically (e.g., once a day) and/or as a result of certain triggering events (e.g., changes to trust rules or other trust information at the trust console 205). As a result of transmittal, the transmitted trust schema 210 can be received by enforcement points of the system (e.g., enforcement points 215 and 220). For example, the enforcement points 215 and 220 may have subscribed to the trust schema 210.

When a first entity needs to communicate with or perform an action on a second entity, the first entity generates a message 225 in which it is the origin 230 and the second entity is the target 235. Permissions (e.g., whether or not the first entity is allowed to communicate with or perform the action on the second entity) are controlled by gating the transmission of the message 225 at one or more enforcement points. For example, enforcement point 215 can block the publication of the message 225 (thereby operating as an origin enforcement point or publication enforcement point), and/or enforcement point 220 can block the subscription of the message 225 (thereby operating as a target enforcement point or subscription enforcement point). In some embodiments, the message 225 is associated with the origin 230 by including the origin's NDN hierarchical name. In some embodiments, the message 225 is cryptographically signed with a private key associated with the origin 230. The origin 230 can also be associated with a certificate 240 that includes the origin's public key. In some embodiments, the public key certificate 240 of the origin 230 is signed by the administrative trust console 205. In some embodiments, the transmitted trust schema 210 also has a public key certificate signed by the administrative trust console 205. These signatures can be validated through a trust chain back to a common root of trust 245. Certificates corresponding to the root of trust 245 can also be stored at each entity, enforcement points, etc., and used for validation. It will be appreciated that the described signature validation ensures that all messages (e.g., messages from first entity to a second entity, administrative messages, trust rules, etc.) come from the specified source (e.g., an origin 230 or trust console 205) and that they have not been modified. It will also be appreciated that each entity has its own key and can function as an origin (e.g., the source of a message), target (e.g., the thing on which the action of the message is to be performed), or administrator. That is, for example, a user (acting as the origin) can request that an action be performed on an electrical resource (acting as the target), and later the electrical resource (acting as the origin) can publish an acknowledgement to which the user (acting as the target) subscribes.

Conditions 250 can be system status flags such as normal or maintenance, and/or can be time-based (e.g., 10:00 am-noon for day with a scheduled DER site visit). Conditions 250 can also encompass real-time system conditions like electrical fault, overload condition, or a "red flag" warning of fire risks requiring deenergizing parts of the electrical grid. The trust rule created with the trust console 205 can be qualified based on the conditions 250. For example, a certain trust rule may only permit an action to be performed on a target when a certain condition 250 is or is not present in the infrastructure system.

It will be appreciated that by using communications between origins and targets as the method of effectuating actions over targets, the secure DER communication system can provide one or more of the following benefits. It can provide that no action can occur unless an explicit message is sent to execute it, which forms the foundation of a zero-trust system. It can utilize enforcement points, implemented at various points in the communication path, to block or allow communications, thereby controlling actions. That is, enforcement points can use trust rules to decide whether to allow communications to pass to perform an action. It can provide that administrators create trust rules which explicitly allow a particular action to be performed when the corresponding origin and target (and optionally, condition) of the trust rule are satisfied. It can provide that administrators assign identities (e.g., names) to entities, such that they may function as origins and targets. It can provide that the action specified in a message must map to a named action unambiguously. And it can provide that system conditions must be defined such that enforcement points can check them unambiguously. It can provide that access is denied unless explicitly granted. In other words, so long as any combination of trust rules results in a requested access being allowed, it is allowed; otherwise the requested access is blocked. And in some embodiments, the trust console 205 constructs NDN names and trust rules to guarantee that NDN trust enforcement is applied universally and unambiguously.

As illustrated by the representative message flow 200, the secure DER communication system can employ multiple enforcement points (e.g., publication enforcement point 215 and subscription enforcement point 220, although other enforcement points corresponding to other entities can be used as well). It will be appreciated that there are several advantages to using multiple enforcement points. For example, even though messages are encrypted and signed, it is advantageous for cybersecurity to minimize the attack surface by not sending messages widely to targets, where it is known from the trust rules that they are not allowed. As a further example, to reduce data load on the network, unnecessary messages should not be sent and clutter the network. As a still further example, an enforcement point at an origin can verify the certificate of the sender who signs the message as well as the target specified in the message against the trust schema. However, the origin enforcement point cannot typically validate for certain that the message will actually go to the target. However the target enforcement point has access to additional information (e.g., private key and certificate associated with the target) for the target to fully validate that the message is received by the correct target system and that this transaction is authorized by the root of trust 245 per the rules in the trust schema.

Defining Trust Rules in a Secure DER Communication System

Figure 3:
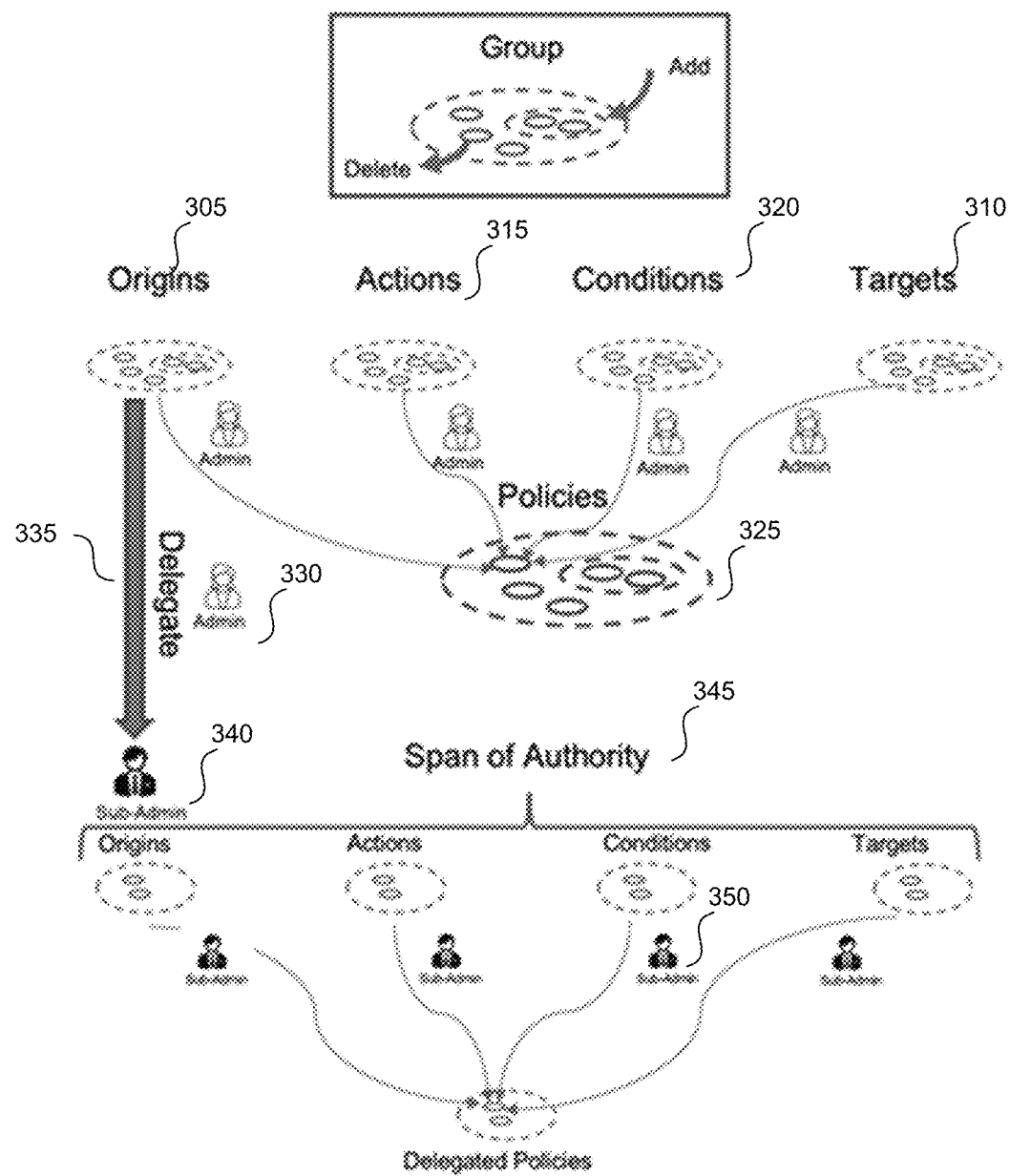
FIG. 3 is a graphical illustration of a process for specifying trust rules, utilized by a secure DER communication system in accordance with representative embodiments of the present technology, through grouping and delegation.

As described herein, the secure DER communication system secures the communication between infrastructure elements (e.g., verifies that an origin is allowed to have an action performed on a target) through the enforcement of trust rules. While a trust rule can define the levels of trust for individual elements (e.g., what actions a single origin can request of a single target), the secure DER communication system can additionally specify more complex trust rules by defining groupings of elements, as illustrated in FIG. 3. That is, trust rules can define behaviors for groupings of origins 305, targets 310, actions 315, and/or conditions 320.

In some embodiments, groupings of origins 305, actions 315, conditions 320, and targets 310 draw from libraries of like elements previously defined in the secure DER communication system (e.g., the trust console), or imported into the system from an external source (e.g., a standards group). In some embodiments, the previously-defined elements can be imported from another system (e.g., a system associated with a standards group). For example, an authentication system, such as LDAP, can specify how different origins 305 should be grouped into roles (e.g., how some users are grouped into an engineer role, how some users are grouped into an administrator role, etc.). The various elements (e.g., origins 305, actions 315, conditions 320, and/or targets 310) can be combined into groups (from existing elements or groups of elements, and/or from new elements defined via the trust console), thereby forming the basis for Role Based Access Control (RBAC). Likewise individual elements or sub-groups of elements can be deleted from an overall group of elements. Similarly, trust rules can be grouped into what are referred to as policies 325. Furthermore, a library of existing rules and policies can be combined into a policy group, and policies can be combined into a trust schema.

In some embodiments when a trust rule is to be added to the group, it must first be created from the appropriate origin 305, action 315, condition 320, and target 310 elements. This new rule would also typically be stored in the rule library.

In some embodiments, the secure DER communication system can assign location and other attribute limitations to certain targets (e.g., resources). To assign location limitations on DERs, for example, as each DER is commissioned into the infrastructure provider's system, the DER can be added to a DER device inventory list along with attributes including a device ID, latitude, longitude, address, and other characterizing information (e.g., inverter type). In some embodiments, this commissioning process can be performed automatically. The secure DER communication system can use these target attributes to form target groups for corresponding trust rules (e.g., a trust rule governing a group of targets at a certain address, latitude/longitude, and/or inverter type).

In conventional systems, unrealized errors in the trust schema can result in security vulnerabilities, which may not be readily apparent. In addition, due to the complexity of constructing an accurate trust schema, there are potential incentives for users of conventional systems to short-cut the process (e.g., applying an always-on default schema). The secure DER communication system and trust console simplifies the construction of accurate schema for infrastructure systems, and verifies that they are enabled properly. As described herein, in some embodiments the system also provides logging and archiving of trust rules, which can help with enforcement. It will be appreciated that the secure DER communication system, as a result, enhances the overall security of the infrastructure communications network. In addition, in some embodiments, the secure DER communication system utilizes VerSec to check the logical consistency of trust rules to ensure there are no conflicts.

In some embodiments of the secure DER communication system, the trust console additionally provides delegation of rule-making authority. It will be appreciated that for large infrastructure organizations, it is typically impractical for a single administrator to create rules for the entire organization, as this can be a significant organizational bottleneck. Typically, the administrator will not know all the details of the requirements of small departments within the organization. With the delegation capabilities of the trust console, an admin 330 can delegate 335 authority to a sub-admin 340 to create trust rules. The delegation 335 can grant to the sub-admin 340 a span of authority 345 that is a subset of the authority of the delegating admin 330. That is, for example, the sub-admin 340 may be delegated the ability to manage (e.g., add, delete, modify, etc.) trust rules covering a subset of the origin 305, action 315, condition 320, and/or target 310 over which the admin 330 has control. In some embodiments of the secure DER communication system, delegation is securely controlled and implemented by the trust console using NDN trust rules (that is, indications of delegated authority are themselves embodied in trust rules). In some embodiments of the secure DER communication system, said trust rules can employ VerSec, although delegation is not natively supported in VerSec.

In some embodiments of the secure DER communication system, a sub-admin 340 can further delegate rule specification authority to a second level sub-admin (e.g., any of second level sub-admins 350) with a span of control that must be less than or equal to the span of control of the delegating sub-admin 340. Moreover, the sub-admin 340 can limit the span of control for the second level sub-admin 350 to further delegate authority to a third level sub-admin (not illustrated). So for example, the sub-admin 340 can separately delegate to two different second level sub-admins 350, where one is allowed to further delegate, and the other can do no further delegation. Unless explicitly restricted in the prior delegation, this process can be repeated in a hierarchical fashion with the NDN rule generation namespace in the certificate following the same hierarchy. Thus, the delegated authority is limited to only being able to set trust rules over what is delegated to them, which can secure against insider attacks in other areas. In cases where a delegated admin lacks the span of control to perform a required action, the trust rule key certificate name hierarchy shows which origin user has delegated the authority to the admin, and the trust console can send an automated secured message up the chain requesting additional access. The request for additional access on behalf of the admin can then be allowed or denied based on other out-of-band information the delegator may have (e.g., like a phone call or approval process). This requesting process can be repeated up the chain if needed until a delegator with sufficient authority is found. In some embodiments, all of the trust rules and certificates trace back to a root trust rule admin key, which has the ultimate authority to grant all subordinate keys in a hierarchical fashion.

FIG. 4 is an illustration of representative trust rules and certificates, used in a secure DER communication system.

As illustrated in FIG. 4, representative trust rules can include publication trust rules 405, enforced at an origin enforcement point, and subscription trust rules 408, enforced at a target enforcement point. Publication trust rules 405 and subscription trust rules 408 include various fields defining the scope of the corresponding trust rule (e.g., what actions are allowed to be performed). For example, publication trust rules 405 includes message field 410 and type field 415. As illustrated in FIG. 4, for example, one publication trust rule 405 can be of type request, and include a message (or action) requesting the daily energy reading of a target. Similarly, another publication trust rule 405 can be of type response, and include a message (or action) that returns the current daily energy value. Publication trust rules 405 can also include a target field 420, that indicates which intended target of the message 410 the trust rule governs. The target field 420 can refer to any entity in the infrastructure system, such as users and resources. For example, the request-type publication trust rule 405 lists as targets various resources (e.g., nuclear and DER), while the response-type publication true rule 405 lists as targets various user roles (e.g., controller and viewer). Roles field 425 defines whether the corresponding role is permitted to make the request of message 410. For example, as illustrated in FIG. 4, both a controller and a viewer can make a daily energy reading request of a DER, but only a controller can make a daily energy reading request of a nuclear resource. As a further example, a nuclear resource can respond with a current daily energy value to a controller, but is blocked from sending a reading to a DER.

Representative subscription trust rules 408 include information similar to corresponding publication trust rules 405. However, as illustrated in FIG. 4, while publication trust rules 405 include target field 420 (so that, e.g., on publication an enforcement point can enforce a rule based on the target of a message), subscription trust rules 408 include origin field 430 (since, e.g., an enforcement point at subscription is enforcing rules based on the origin of a message).

FIG. 4 additionally illustrates representative certificates 435. Certificates 435 can include an identifier 440 of the particular entity associated with the certificate, and the role 445 to which that entity belongs. The identifier 440 and role 445 collectively define the name 450 of the certificate 435, which identifies the entity in the hierarchical NDN namespace. A certificate 435 can additionally include information identifying the authority 455 that signed the certificate.

Figure 5:
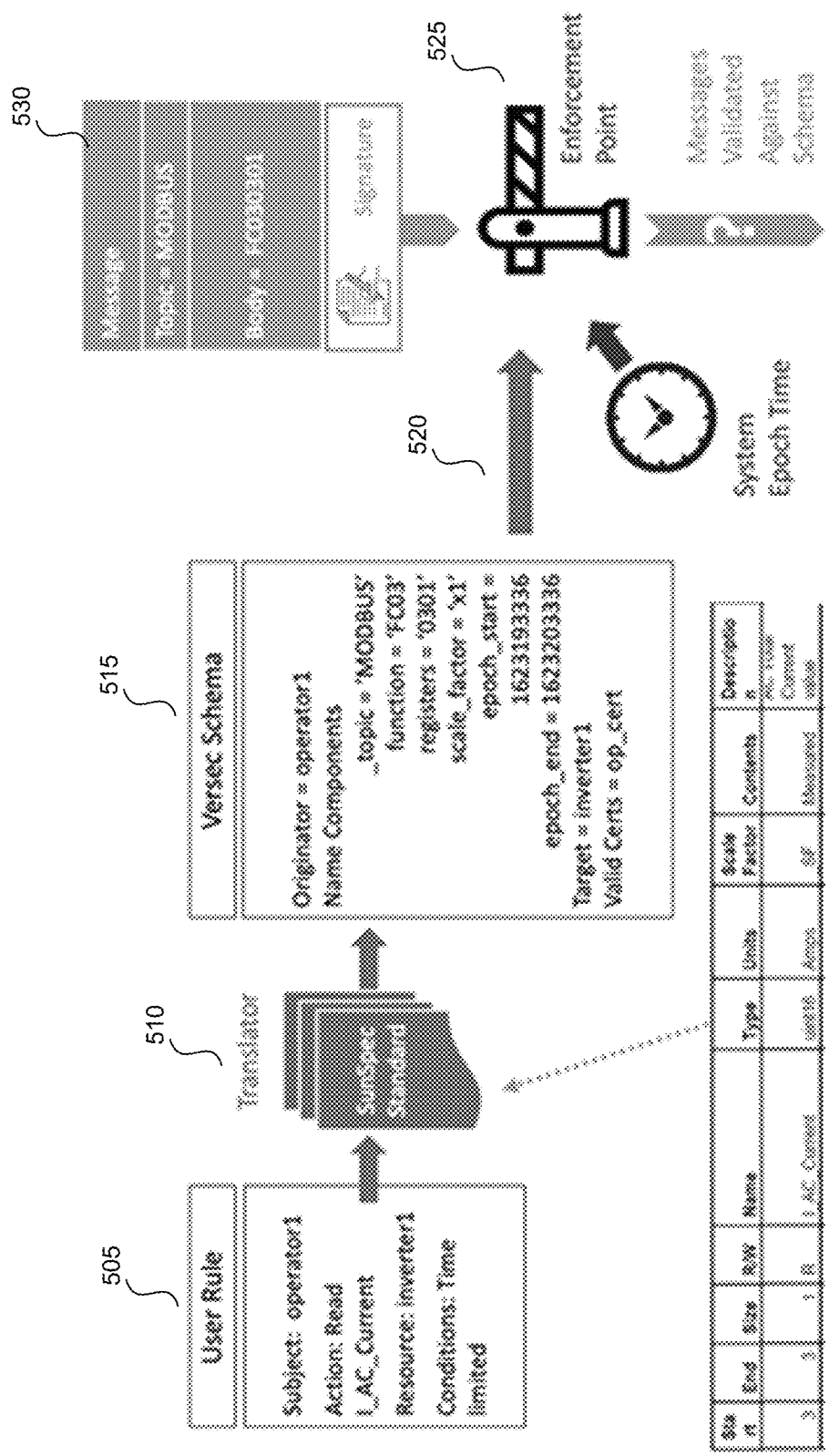
FIG. 5 is an illustration of generating a representative rule for controlling access to a DER, used in a secure DER communication system, in accordance with representative embodiments of the present technology.

FIG. 5 is an illustration of a process for generating a representative rule for controlling access to a DER, used in a secure DER communication system. In particular, FIG. 5 illustrates creating a trust rule for a representative DER, controlled by modbus and using the actions defined by the SunSpec modbus standard, and where VerSec is used for access control.

As illustrated in FIG. 5, a user of the system (e.g., an administrator or other user with delegated authority) can input a user rule 505 into a secure DER communication system (e.g., via a trust console). As described herein, the user rule can specify permitted communications between entities in an infrastructure system. For example, illustrated user rule 505 specifies that an "operator1" is authorized to read the AC current (corresponding to the action) of an "inverter1" DER of the infrastructure system. User rule 505 further includes a condition that operator1's authorization to do so is time limited (e.g., during certain specified days and/or times). Once the user rule 505 has been input, the system can translate 510 the user rule 505 into an access control message 515. In the illustrated example of FIG. 5, the translation 510 is based on the SunSpec modbus standard, and the access control message 515 uses the VerSec schema. The access control message 515 can then be published 520 as an NDN packet.

VerSec is a compiled open source application that efficiently captures trust rule requirements in a schema, which is a signed and optionally encrypted NDN data packet. NDN can generate hierarchical keys and certificates, tied to a trust anchor each with a unique hierarchical name that should map to the roles for a user with that certificate. The trust anchor is a common root key that can be preloaded for all devices for authentication. Certificates are associated with each rule, and only a subject who has the certificate can attempt to execute the corresponding action. The secure DER communication system (e.g., at a first enforcement point 525) can block publishing a message 530 if the certificate is missing, though the certificate can be requested first over NDN packet transport if the origin is authorized to obtain it. A second enforcement point may be at the end of the communication chain, where a target can be blocked from subscribing to the action publication. This second enforcement point can advantageously guard against security flaws that could include man-in-the middle or counterfeit client attacks. By verifying that the correct certificate is present to allow the action and that the signature of the certificate is valid and traceable back to the trust anchor, the action request can be robustly authenticated.

Since the trust rules can be embodied as NDN data packets, they can have all of the cybersecurity advantages of NDN data packets. That is, for example, they can be encrypted and signed so they cannot be deciphered or altered. Of course, the NDN trust rule security is in addition to the inherent NDN security and trust of the DER data transfer itself, which is governed by the trust associated with the NDN data keys that have been verified by the trust console. That is, both the communications between a utility operators and DERs, as well as rules that govern those communications, are each secured.

Although FIG. 5 illustrates a translator for the SunSpec modbus standard, the secure DER communication system can implement translators for other protocols like IEC 61850, DNP3, or IEEE 2030.5. In some embodiments, these translators can share a common high-level behavioral trust rule, with the choice of translator depending on the protocol of the equipment at the target endpoint. Supported standards-based policies describe an industry-standard set of business roles and permissions that support efficient business operations, without granting unnecessary access that compromises security. Custom user policies can be created for specific use cases, possibly via modification of other existing rules.

Figure 6:
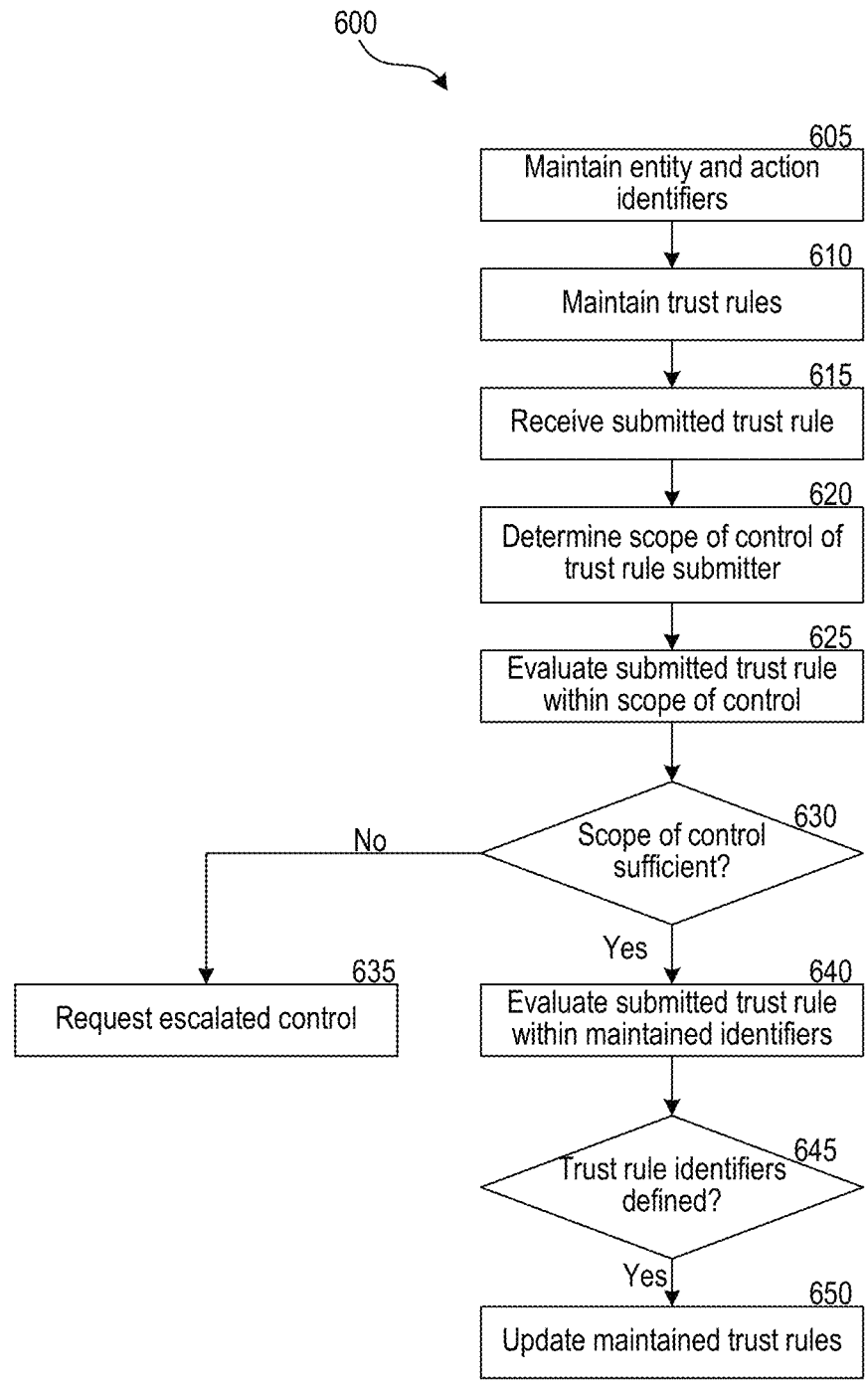
FIG. 6 is a flowchart of a process implemented by a secure DER communication system for managing trust rules, in accordance with representative embodiments of the present technology.

FIG. 6 is a flowchart of a process 600, implemented by a secure DER communication system, for managing (e.g., creating, deleting, editing, etc.) trust rules.

The process 600 begins at block 605, where the system maintains identifier information for entities (e.g., users, resources, etc. of an infrastructure system), actions (e.g., requests that can be made of and/or commands to be performed by entities), and conditions (e.g. time of day that rules apply and/or system statuses that must be present for rules to apply). In some embodiments, the identifiers are NDN names in a hierarchical namespace.

At block 610, the system maintains trust rules for the infrastructure system. In some embodiments each trust rule is a triad, comprised of an origin identifier, a target identifier, and an action identifier. As described herein, a trust rule defines whether an entity associated with the origin identifier is permitted to perform an action associated with the action identifier on an entity associated with the target identifier. In some embodiments a trust rule can additional include a condition.

At block 615, the system receives a submitted trust rule from a submitter, which represents a proposed change to the maintained trust rules. That is, for example, the submitted trust rule can be a proposed new trust rule to be added to the system. As a further example, the submitted trust rule can be a proposed modification of an existing trust rule of the system. As a still further example, the submitted trust rule can be a proposed deletion of an existing trust rule.

At block 620, the system determines the degree of control of the submitter of the submitted trust rule. As described herein, different submitters (e.g., admins, sub-admins, etc.) have different levels of authority. That is, certain submitters are permitted to manage trust rules governing certain entities and/or actions, whereas other submitters are not.

At block 625, the system evaluates whether the submitted trust rule is within the submitter's scope of control. If, for example, the submitter is authorized to manage trust rules over the origin entity, target entity, and action of the submitted trust rule, then the submitted trust rule is within the submitter's scope of control.

At decision block 630, the system determines whether the submitter has sufficient scope of control for the submitted trust rule. If it is determined that there is not sufficient control, then the process 600 continues to block 635. If it is determines that there is sufficient control, then the process 600 continues to block 640.

If it was determined that the submitter does not have sufficient scope of control for the submitted trust rule, then at block 635 the system requests escalated control for the submitter. In some embodiments, and as described herein, information associated with the submitter can identify, in the hierarchical namespace, the entity that delegated authority to the submitter. The system can generate the escalation request to the delegating authority based on the hierarchical namespace.

If it was determined that the submitter does have sufficient scope of control for the submitted trust rule, then at block 640 the system evaluates whether the submitted trust rule identifiers (e.g., the entities identified by the origin and target identifiers, and the action identified by the action identifier) are part of the identifiers maintained by the system. In other words, the system evaluates whether the submitted trust rule refers to any entities or action not already defined for and maintained by the system.

At decision block 645, the system determines whether the identifiers of the submitted trust rule are maintained by the system. If it was determined that the submitted trust rule identifiers are maintained by the system, then processing continues to block 650, where the maintained trust rules are updated. That is, for example, if the submitted trust rule corresponds to a new trust rule, the new trust rule is added to the system. If, as a further example, the submitted trust rule corresponds to a modification of an existing trust rule, that trust rule is modified.

Enforcing Trust Rules in a Secure DER Communication System

Figure 7:
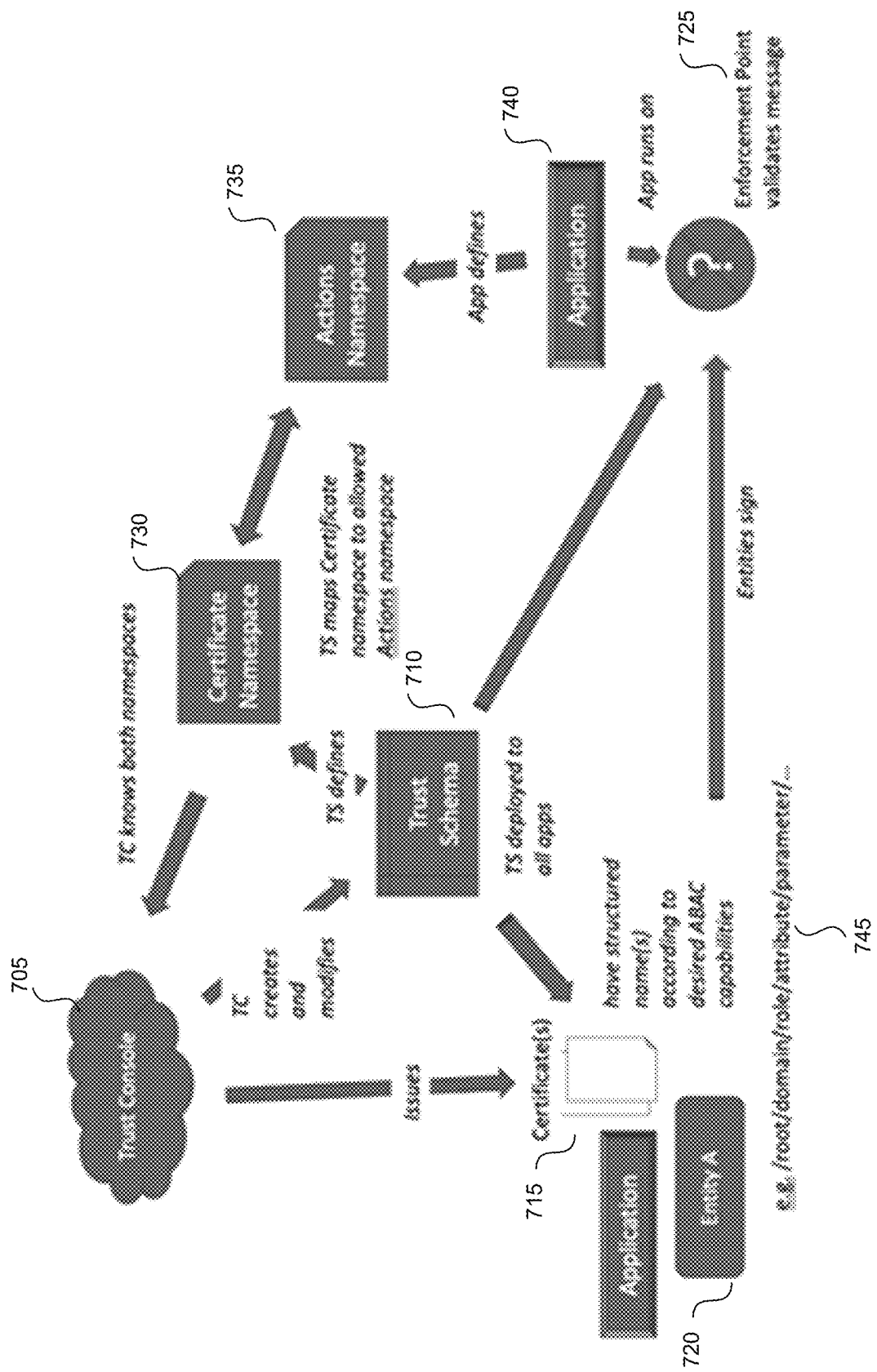
FIG. 7 is an illustration of the enforcement of trust rules, through a trust schema in a secure DER communication system, in accordance with representative embodiments of the present technology.

FIG. 7 is an illustration of the enforcement of trust rules, through a trust schema, in a secure DER communication system. In particular, FIG. 7 illustrates the relationship between (1) a trust console 705 of a secure DER communication system, which creates a trust schema 710 (e.g., a VerSec trust schema) and issues signed entity certificates 715, (2) an origin "entity A" 720, which signs and transmits a message requesting an action, and (3) an enforcement point 725, associated with an entity (e.g., an enforcement point entity), which only allows valid messages to pass as defined by the trust console 705 and an associated trust schema certificate.

The trust console 705 can generate multiple entity certificates 715, each of which can correspond to a different entity. For example, the trust console 705 can generate a first entity certificate 715 corresponding to entity A 720, and a second entity certificate 715 corresponding to the enforcement point entity. Based on the trust schema 710, the trust console 705 can define a structured hierarchical certificate namespace 730 of the entity certificates 715. Furthermore, an application 740 running on the enforcement point 725 and/or enforcement point entity can define an associated allowed actions namespace 735. The certificate namespace 730 and actions namespace 735 enable the secure DER communication system to define a binary schema completely and succinctly. As described herein, the application 740 can utilize the actions namespace 735, in combination with the binary schema, to enforce the correct behavior.

When a message is transmitted (e.g., from entity A 720), the enforcement point 725 can verify an immutable signature 745 of the message to determine and authenticate the role for entity A, using the specific entity certificate 715 corresponding to entity A in the hierarchical certificate namespace 730, which explicitly defines the roles of entity A. The signed message requests a specific action from the allowable actions namespace 735 from the enforcement point entity. The entity certificate 715 corresponding to the enforcement point entity gives the role of the enforcement point entity. The enforcement point 725 can unambiguously and efficiently determine if access is allowed using the binary rule in trust schema 710 for the specific action, as well as the roles for entity A 720 and the enforcement point entity as defined in the certificate namespace 730. Corresponding to zero trust principles, access is prohibited unless explicitly allowed in the corresponding binary rule in trust schema 710.

In some embodiments, verification by the enforcement point 725 of whether an access is allowed can use hierarchical NDN naming. For example, in some embodiments the entity certificate name also has a hierarchal NDN format which makes it possible for the enforcement point 725 to validate the allowed roles for entity A 720 as governed by its entity name in the signature 745 of the action request, and the corresponding rule in the trust schema 710. Without a properly defined hierarchical name it would not be possible for the enforcement point 725 to determine the role of each entity, and hence the allowed actions as defined by the trust rule. The design of the actions namespace 735 and certificate namespace 730 is typically application specific and is part of the trust console 705 design. It will be appreciated that while VerSec provides a particularly efficient description and implementation of the trust rules, other formats can be used by the trust console 705 that provide similar or abbreviated access control capabilities.

In some embodiments, each entity has a private key, which for example can be stored in a hardware Trusted Platform Module (TPM) which has an associated public key certificate, optionally in a hierarchical chain, but eventually signed by a trust anchor.

Figure 8:
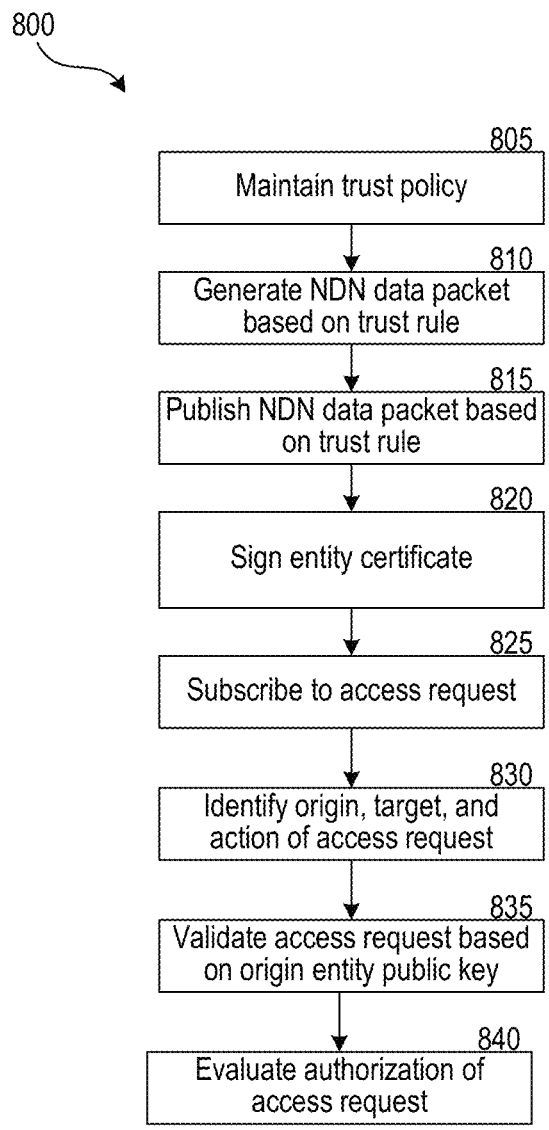
FIG. 8 is a flowchart of a process implemented by a secure DER communication system for enforcing trust rules, in accordance with representative embodiments of the present technology.

FIG. 8 is a flowchart of a process 800 implemented by a secure DER communication system for enforcing trust rules The process 800 begins at block 805, where the system maintains a trust policy comprised of one or more trust rules. As described herein, each trust rule can include identifiers corresponding to the origin, target, and action of any corresponding access request subject to the trust rule. The one or more trust rules and/or trust policy can be maintained, for example, by a trust console.

At block 810, the system generates an NDN data packet based on at least one of the trust rules of the maintained trust policy. In some embodiments, the system can generate an NDN data packet based on a plurality of trust rules, including all of the trust rules of the trust schema.

At block 815, the system sends or publishes the generated NDN packet on a communication channel. As described herein, in response to the publication of the generated NDN data packet, entities (e.g., users and/or resources) of an infrastructure system, and associated enforcement points, can subscribe to or receive the generated NDN package.

At block 820, the system cryptographically signs a certificate associated with one of the entities of the infrastructure system. In some embodiments the signed certificate includes a name associated with the entity and defined in an NDN hierarchical namespace. In some embodiments the certificate includes a public key associated with the entity. In some embodiments the system signs a plurality of certificates, each associated with an entity.

At block 825, the system (e.g., an enforcement point associated with an entity) subscribes to an access request message. As described herein, the access request message characterizes a request made by a first entity (e.g., an origin) of one or more second entities (e.g., a target) to provide data, execute a command (e.g., an action), etc. In some embodiments, the access request message is cryptographically signed by the first entity (e.g., using the private key of the entity associated with the access request origin).

At block 830, the system identifies the origin, target, and action associated with the subscribed-to access request message.

At block 835, the system validates the access request message based on a certificate associated with the origin entity. For example, in some embodiments the system validates the access request using a public key associated with the origin entity. In some embodiments the origin entity certificate can be validated with a trust anchor certificate.

At block 840, the system evaluates whether the access request is authorized. The access request may be authorized, for example, if a published trust rule indicates that the origin entity is permitted to request the action of the target entity.

Logging Trust Rules in a Secure DER Communication System

In some embodiments of the secure DER communication system, the trust console provides trust rule Logging. For example, in certain embodiments, one or more trust rule additions and/or changes can be logged in an archive. In some embodiments, the archive can be an immutable distributed ledger, such as a blockchain. It will be appreciated with trust rule logging, if there is a cybersecurity incident the system will enable forensics to determine who authorized the intrusion (even if inadvertently), and how best practices can be improved in the future. In certain embodiments of the system, the trust rule log is stored as NDN data packets, which are signed and encrypted, and are in the immutable ledger and therefore the trust rule log cannot be altered without detection. Furthermore, the trust rule log can be configured in the trust console such that it is only accessible by authorized individuals (e.g., a head of security). It will be appreciated that, as a result, an intruder cannot wipe any intrusion log to escape detection.

As DER communication network requirements evolve, the form of the trust rules and conditions can adapt by adding functionality to the trust console. Thus, new rules can be created and added, without requiring significant changes to the legacy deployed trust rules. These changes in trust rules can be logged as well by the system, together with the name of the employee making the change and the date. If trust rules change frequently, the trust schema can be set with an expiration date and the trust console can distribute the latest version, with unused rules deleted. This is sometimes referred to a "garbage collection," and can be used advantageously to maintain efficient enforcement of the trust rules, as temporary rules are created in the trust console and then are no longer required.

Visualizing Names and Trust Rules in a Secure DER Communication System

In a complex infrastructure system, the number of named entities that form the system, and the collection of stored rules, is often extensive. The secure DER communication system therefore provides, in some embodiments, ways of visualizing the names and rules. It will be appreciated that visualizing complex trust rules is helpful for ensuring that they are implemented in a consistent manner.

Figure 9:
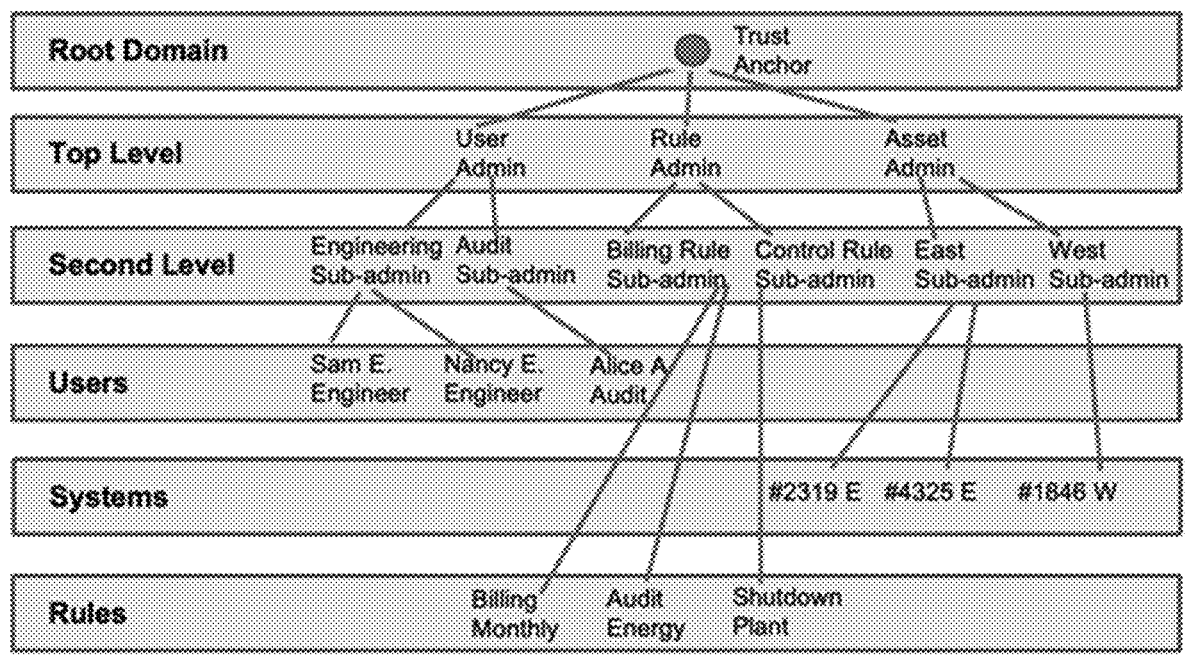
FIG. 9 is an illustration of a representative hierarchical namespace visualization, generated by a secure DER communication system, in accordance with representative embodiments of the present technology.

FIG. 9 is an illustration of a representative hierarchical namespace visualization 900, generated by a secure DER communication system. Each line represents a signing operation in the trust chain. That is, for example, a trust anchor signs for various top-level roles (e.g., user admin, rule admin, and asset admin). Further, each of the top-level roles sign for second-level roles, and so on. In this manner, users (e.g., an administrator of the trust console) can inspect the namespace for separated non-hierarchical members or for unexpected topological faults.

Figure 10:
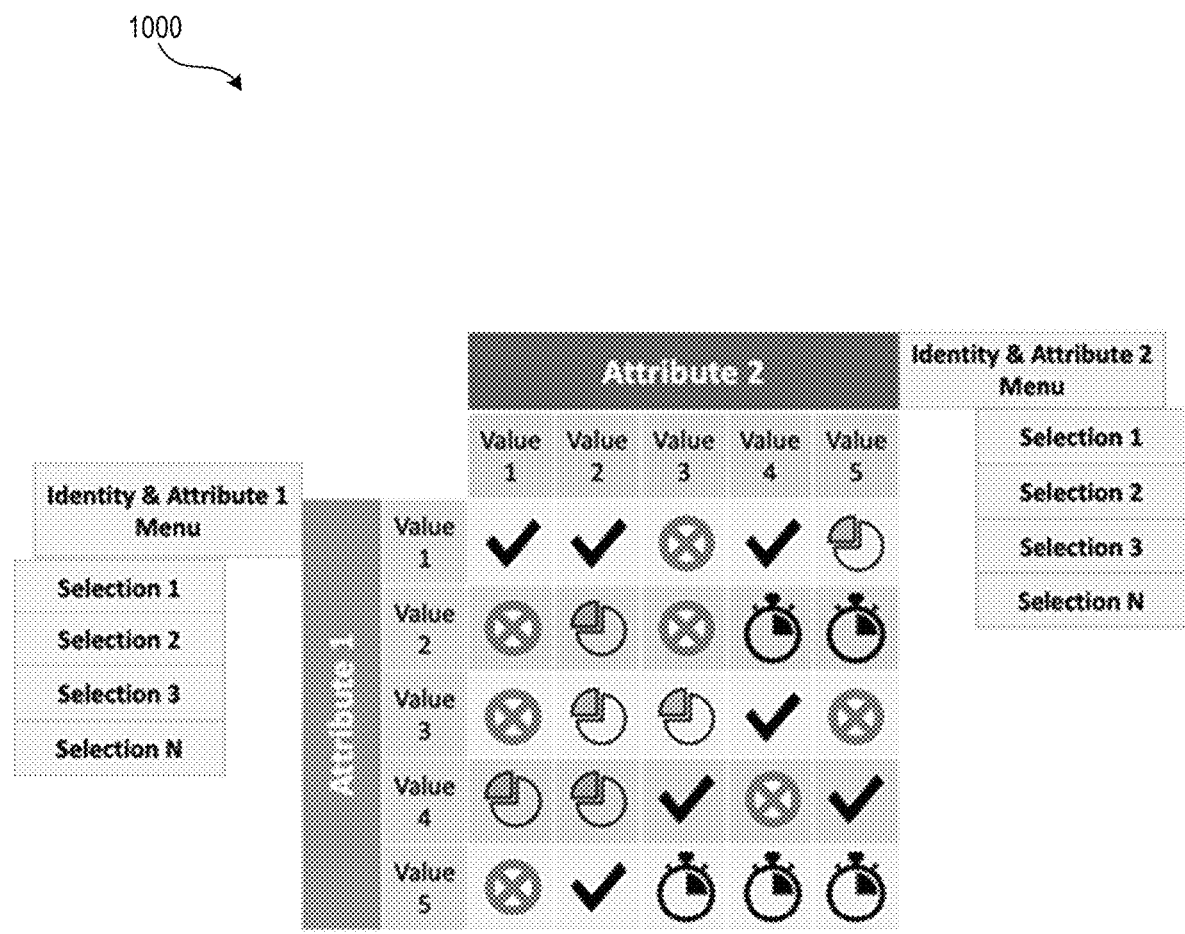
FIG. 10 is an illustration of a representative trust rule visualization, generated by a secure DER communication system, in accordance with representative embodiments of the present technology.

FIG. 10 is an illustration of a representative trust rule visualization 1000, generated by a secure DER communication system. In the example of FIG. 10, the trust rule visualization 1000 is represented by a 2-D matrix. In the 2-D matrix view, either single or subsets of available system entity identifiers and namespace attributes can be selected on each of two axes. In the corresponding table cells, the status of the relevant trust relationship can be indicated, either by text or graphics. For instance, FIG. 10 illustrates the use of icons that provide a high-level summary of whether there is a permitted action (checkmark), prohibited action ('X'), a time-limited permitted action (stopwatch icon), or a more complex partially permitted relationship (pie chart).

In some embodiments of the secure DER communication system, 2-D matrix view can be used as a method of modifying the corresponding trust rules. That is, icons can be changed in the 2-D matrix view and new rows or columns can be added to the attribute lists. The corresponding new rule and functionality can then be saved to a different name.

Parallel Communication Paths of a Secure DER Communication System

Figure 11:
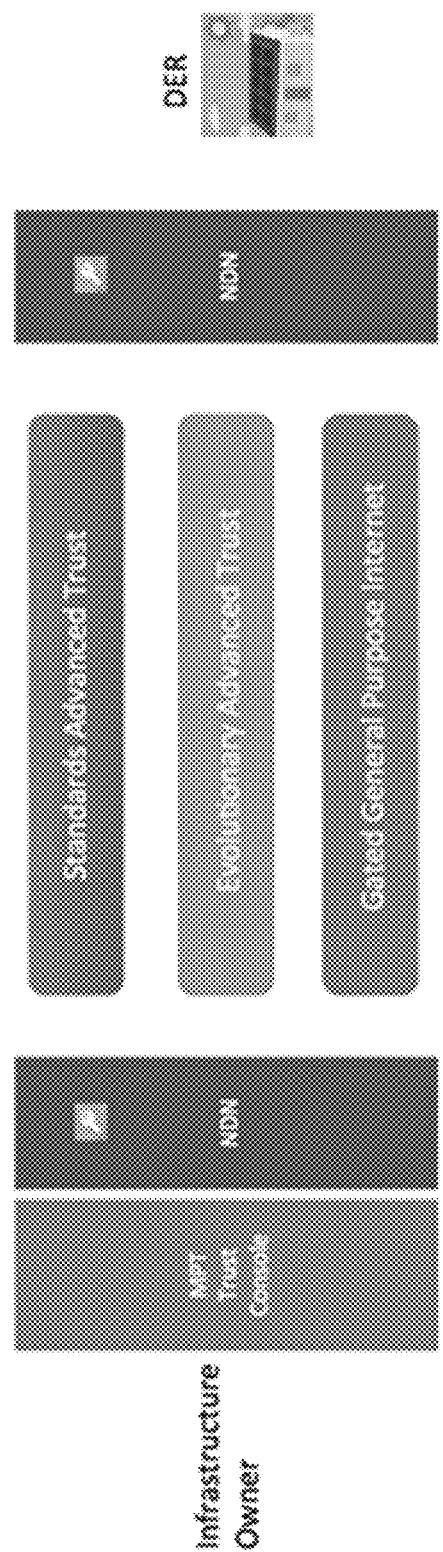
FIG. 11 is an illustration of uses of a secure DER communication system, in accordance with representative embodiments of the present technology, with different infrastructure data communication networks.

FIG. 11 is an illustration of uses of a secure DER communication system with different infrastructure data communication networks. As illustrated in FIG. 11, the secure DER communication system can use NDN to handle various use cases of infrastructure data communication networks, representing different classes of action. The representative FIG. 11 illustrates three such paths: (1) standards advanced trust, (2) evolutionary advanced trust, and (3) gated general purpose Internet.

As illustrated in FIG. 11, these paths can be used to form connections from an infrastructure owner's supervisory control and data acquisition (SCADA) industrial control system to the infrastructure network assets (including DERs) that are not connected directly to the infrastructure owner's private SCADA network. In some embodiments NDN supplies additional security, and the trust console provides granular access control as defined by the corresponding trust rules.

In standards advanced trust, DER communications standards such as IEEE 2030.5, DNP3 or Modbus provide direct control of the assets with access control via the trust console.

In evolutionary advanced trust, the asset can be accessed and controlled with a lightweight NDN protocol, with access control via the trust console.

In gated general purpose Internet, the system continues to enable controlled public internet access to the DER with a firewall configurable over NDN, as defined by the trust console. This allows direct connection from the DER vendor cloud to the vendor's DER assets.

Advantageously, in some embodiments the secure DER communication system provides an infrastructure owner the capability to configure the trust and security settings of combinations of the standards advanced trust, the evolutionary advanced trust, and the gated general purpose internet with a common trust console. Multiple capabilities are typically required to securely maintain and operate a DER asset.

In some embodiments of the secure DER communication system, NDN security mechanisms controlled by the infrastructure owner are used to authenticate and control network traffic over all three paths, as specified by the trust schema from the trust console. In some embodiments, the NDN security mechanisms are always used. This approach directly addresses earlier concerns related to DER network communications that are increasingly fragmented with varying protocols and security approaches.

It will be appreciated that under the representative embodiment illustrated in FIG. 11, all aspects of the infrastructure owner's communications network are wrapped with a very secure NDN fabric layer controlled by the trust console. This uniformly enforces security compliance, as defined by the granular trust rules set up by the infrastructure owner.

Evolutionary Advanced Trust and a Secure DER Communication system

NDN enables local connections and data caching at nearby nodes which improves the resiliency, latency, and throughput of advanced wireless systems. In some embodiments of the secure DER communication system, NDN can be used to secure connect long range (LoRa) mesh and 5G mobile edge computing, as well as other wireless protocols, with access control set by the trust console. These edge connections have significant advantages in terms of the infrastructure communications requirements, particularly in latency and bandwidth, which are often severely restricted by transferring data to and from the internet itself.

Another use for evolutionary advanced trust in some embodiments of the secure DER communication system is ensuring a trusted source is used for secure software upgrades, for example in DER systems. This avoids uncontrolled use of the general purpose Internet, which can result in supply chain exploits that introduce malware during an upgrade. Evolutionary advanced trust can be used, in some embodiments of the secure DER communication system, to perform a more trusted upgrade as follows:

(1) A vendor analysis proves a new upgrade can be trusted.

(2) The infrastructure owner performs an independent analysis and testing to check the integrity of the image and verifies that the image is properly signed for authentication.

(3) The image is securely sent over NDN packets to the DER asset directly, including NDN access control as specified by the trust console.

(4) The NDN DER end device enforces the NDN trust rules, and locally converts the NDN packet stream, checks the image's signing for authentication and routes the original upgrade data stream to the DER. This securely completes the upgrade in the trusted local environment. It is possible to publish the software upgrade to multiple DER assets at a time, simplifying the secure upgrade of fleets of DER assets, reducing time and cost. This process is fully under the control of the infrastructure owner, including permissions for each user, and does not depend on the security of the general purpose internet.

Gated General Purpose Internet and a Secure DER Communication System

Figure 12:
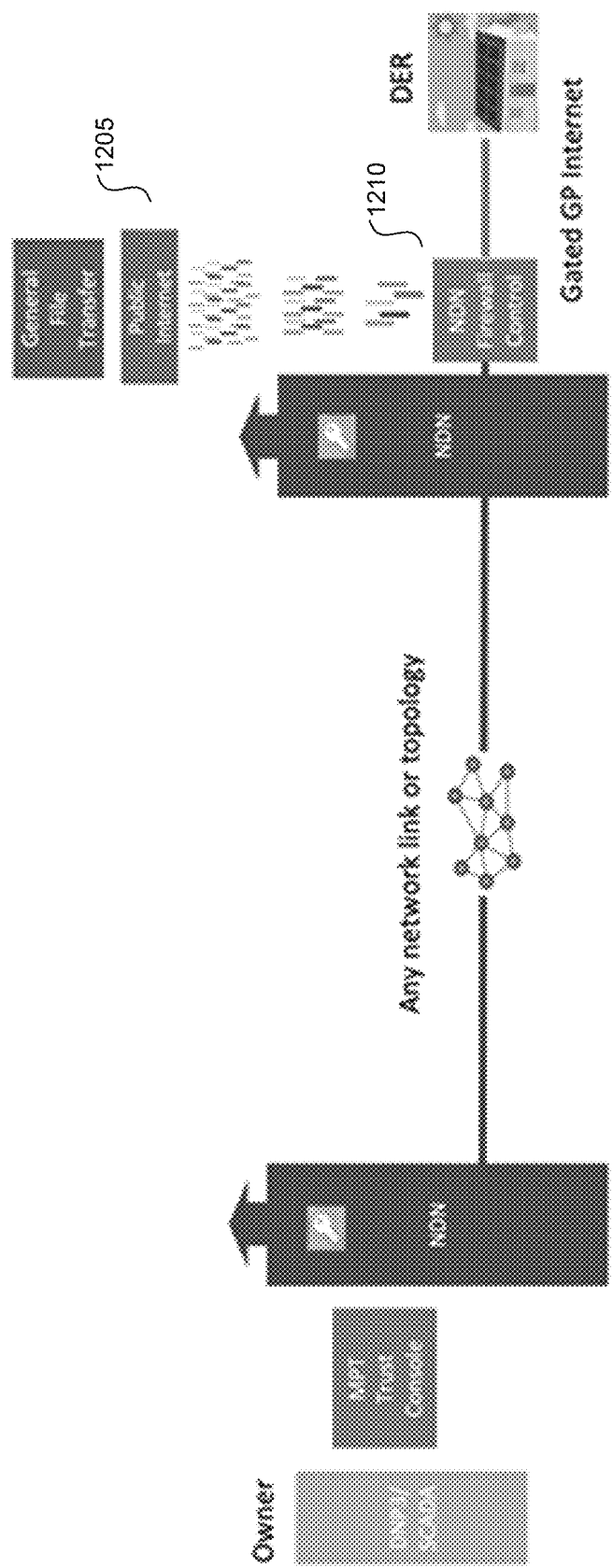
FIG. 12 is an illustration a representative gated general purpose Internet communication pathway, used in a secure DER communication system, in accordance with representative embodiments of the present technology.

FIG. 12 is an illustration a representative gated general purpose Internet communication pathway, used in a secure DER communication system. In some embodiments of the secure DER communication system, an open Internet connection 1205 can be secured by one or more NDN connection gates, as constrained by an infrastructure owner and as specified by a trust console.

The NDN connection gate (e.g., NDN firewall 1210) can limit access to specific IP addresses, both on the general purpose Internet 1205 as well as the local devices at the site, when connected to an NDN gateway with gated general purpose Internet control. This gated internet link can be used for Observations and Measurements (O&M) functionality, including firmware upgrades, often directly from the vendor portal. This advantageously improves the trust and security of the general purpose Internet connection, with the firewall configured over the ultra-secure NDN link, with trust console access control. Controlled access to the Internet is one of the core capabilities of the Secure Access Service Edge (SASE) architecture, for secure services in distributed and cloud-based networks. Zero Trust is a commonly used with SASE and is enforced by only allowing access over the general purpose Internet connection if the trust rules from the trust console controlling the firewall over NDN explicitly allow it.

The general purpose Internet connection 1205 may optionally be encrypted with TLS security, typically provided by the vendor, and under their certificate control with TLS certificates optionally provided over the secure NDN link. IP addresses of the accessing site on the internet or the controlled infrastructure devices can be restricted by the firewall under NDN control. Virtual Private Network (VPN) tunnels can be added to the internet connection for added security and can be configured with VPN tokens optionally distributed over the NDN link. The gated internet access can also be restricted to selected users with conditions on limited time access periods supplied over the NDN link and controlled by the trust console's trust rules. Finally, a specific file can be transferred over the general purpose internet, for example for a software upgrade. This file can be signed and encrypted for security, optionally using the keys that are part of the NDN system. With trust console firewall control over NDN, the appropriate level of access can be securely configured for each user or group, with permissions governed by the rules in the trust console.

The NDN firewall 1210 can be integrated into a gateway device, in the DER equipment itself, or on some other controller. Software firewalls such as Uncomplicated Firewall (UFW) or IPtables, which provides more granular control, can be used. Other software firewalls as well as hardware firewalls can be employed, with configuration and control provided over the NDN link. More sophisticated firewalls with content filtering and monitoring can also be supported, both embedded in software such as in a gateway, or as a separately controlled hardware device. In all these cases the advanced firewall is controlled over the NDN link, with access control specified by the trust console which is seamlessly integrated into the other trust rule functionality described previously.

Additional Aspects of a Secure DER Communication System

Although the present disclosure describes the secure DER communication system predominantly in the context of electrical infrastructure applications, it will be appreciated that the system can be used with other infrastructure use cases. For example, embodiments of the present technology can be applied to natural gas or hydrogen pipelines, water distribution systems, wastewater systems, and/or industrial controls, such as chemical processing and/or mining systems. Many of these applications will use the same communications standards described, however these protocols are evolutionary and only illustrative. The NDN security framework and trust console, provided by the secure DER communication system, make it possible to add a flexible secure framework to a wide range of applications with physical assets in infrastructure and industrial control.

Although primarily described in the context of electrical infrastructure residential applications, use of the secure DER communication system and trust console is not so limited. That is, DER applies not only to residential systems. It is understood that DER is merely descriptive and that other infrastructure resources can be controlled by the trust console in a similar way, such as larger-scale electrical infrastructure assets like commercial solar PV systems. Also, not all electrical infrastructure assets are generating assets. For example, "Smart Home" thermostats, electric vehicle (EV) chargers, and other electrical loads can be programmed remotely through the electrical infrastructure communications network. This can be used for load aggregation and control and can also apply to larger loads in the infrastructure that can be controlled, such as commercial refrigeration systems.

The term infrastructure owner is descriptive. This is the individual or group that has a vested interest in controlling the security of the system and sets up the trust rules in the trust console. They may not actually have physical or financial ownership of the infrastructure.

While some regulations (e.g., California Rule 21) express the preference for the IEEE 2030.5 communications protocol, other protocols, such as DNP3, Modbus, Generic Object Oriented Substation Events (GOOSE) (including IEC 61850 for substation control) may be utilized by the secure DER communication system as required by other utilities.

Publish and subscribe is primarily used to describe the distribution of trust rules, certificates and messages within NDN to enforce trust. Other mechanisms are possible to send and receive signed messages with a data payload, such as signed interest and/or data exchanges.

It will be appreciated that the secure DER communication system and trust console can be applied in any number of suitable infrastructure systems, including: distributed commercial solar generation facilities; residential DER generation (solar, wind, hydro) systems, consumption (load control) systems, storage (battery) systems; distributed wind generation facilities (utility, commercial and residential scale); gas peaker plants; nuclear power plants; utility fossil fueled generation facilities; geothermal generating plants; sewage treatment facilities; water purification and/or distribution systems; gas infrastructure, pipeline and distribution systems; telecommunications infrastructure (current and next generation cellular, 5G, LoRa, Internet of Things (IoT) devices); and/or industrial Control systems (e.g., food processing and/or chemical systems).

In some embodiments of the secure DER communication system, the system facilitates blocking the use of compromised components. For example, the system can use NDN trust rules to block a selected compromised system. If the trust rule includes a non-volatile hardware key ID, then a particular DER resource such as an inverter cannot be used anywhere in the system once it is disabled. Alternatively, the system or user certificate can be revoked with a Certificate Revocation List (CRL), if the certificate type used supports it, such as X.509 certificates. The CRL can be distributed from a central server using secure NDN distribution so that the CRL server at the certificate authority need only be accessed once. Online Certificate Status Protocol (OCSP) can also be employed in the system to check the revocation of individual certificates.

The following Example provides a further representative implementation of the presently-disclosed technology:

1. A method, performed by a computing system, to secure access to networked electrical power generation load control and storage resources, the method comprising:
    maintaining, at a computing system, a trust policy comprised of a plurality of trust rules, wherein each trust rule comprises an origin identifier, a target identifier, and an action identifier;
    generating a first Information Centric Networking (ICN) message based on a trust rule selected from the plurality of trust rules, wherein the target identifier of the selected trust rule corresponds to a networked electrical power generation load control and storage resource (NEPGLSR);
    sending, on a communication channel, the first ICN message, wherein sending the first ICN message causes an enforcement computing system, on the communication channel and associated with a first entity corresponding to at least one of the origin identifier or the target identifier of the selected trust rule, to maintain authorization information characterized by the origin identifier, target identifier, and action identifier of the selected trust rule;
    cryptographically signing a certificate associated with a second entity, wherein the second entity corresponds to the origin identifier of the selected trust rule, and wherein the certificate includes a second entity name defined in an ICN hierarchical namespace and a second entity public key; and
    wherein the enforcement computing system, in response to receiving a second ICN message, the second ICN message including the second entity name defined in the ICN hierarchical namespace:
        determines, from the second ICN message, a target identifier and an action identifier of the second ICN message, wherein the target identifier of the second ICN message corresponds to the NEPGLSR; and
        determines whether the second entity, associated with the second entity name, is authorized to perform an action, corresponding to the action identifier of the second ICN message, on the NEPGLSR, based on the maintained authorization information.

CONCLUSION

Embodiments of the disclosed technology facilitate the secure communication between various users and resources of an infrastructure system (e.g., an electrical generation utility or other form of infrastructure). In contrast to prior systems, which are susceptible to security failures (due, for example, due to shortcomings in the communication protocols used and/or the difficulty in managing the security rights associated with complex infrastructure systems), the disclosed technology provides controlled third-party access to resources distributed throughout an infrastructure system without sacrificing security.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," and/or any variant thereof, means any connection or coupling, either direct or indirect, between two or more elements; the coupling and/or connection between the elements can be physical, logical, and/or a combination thereof. Additionally, the words "herein," "above," "below," and words of similar import, when used in this application, shall refer to this application as a whole and not to any particular portions of this application. As used herein, the term "and/or," as in "A and/or B" refers to A alone, B alone and both A and B. Where the context permits, words in the above Detailed Description using the singular or plural number may also include the plural or singular number respectively.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, and/or blocks are presented in a given order, alternative implementations may perform routines having blocks, or employ systems having blocks, in a different order, and some processes or blocks may be deleted, moved, added, subdivided, combined, and/or modified to provide alternative combinations or subcombinations. Each of these processes, message/data flows, and/or blocks may be implemented in a variety of different ways. Also, while processes and/or blocks are at times shown as being performed in series, these processes or blocks may instead be performed in parallel, and/or may be performed at different times. Further, any specific numbers noted herein are only examples: alternative implementations may employ differing values and/or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and systems provided herein can be applied to other systems, not necessarily the system described above. The elements, blocks, and acts of the various implementations described above can be combined to provide further implementations.

Any patents and applications and other references noted above, including any that may be listed in accompanying filing papers, are incorporated herein by reference. To the extent any materials incorporated herein by reference conflict with the present disclosure, the present disclosure controls. Aspects of the technology can be modified, if necessary, to employ the systems, functions, and concepts of the various references described above to provide yet further implementations of the technology.

From the foregoing, it will be appreciated that specific embodiments of the disclosed technology have been described herein for purposes of illustration, but that various modifications may be made without deviating from the technology. For example, the disclosed technology may be used with ICN data transfers performed by sending a request and receiving a response data packet, without using publish and subscribe. As a further example, the disclosed technology may be used to secure data communications outside of the utility infrastructure context (e.g., interest data exchanges). Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method, performed by a computing system, to secure access to networked electrical power generation load control and storage resources, the method comprising:
    maintaining, at a computing system, a trust policy comprised of a plurality of trust rules, wherein each trust rule comprises an origin identifier, a target identifier, and an action identifier;
    generating a first Information Centric Networking (ICN) message based on a trust rule selected from the plurality of trust rules, wherein the target identifier of the selected trust rule corresponds to a networked electrical power generation load control and storage resource (NEPGLSR);
    publishing, on a communication channel, the first ICN message, wherein the publication of the first ICN message causes an enforcement computing system, on the communication channel and associated with a first entity, to maintain authorization information characterized by the origin identifier, target identifier, and action identifier of the selected trust rule;
    cryptographically signing a certificate associated with a second entity, wherein the second entity corresponds to the origin identifier of the selected trust rule, and wherein the certificate includes a second entity name defined in an ICN hierarchical namespace and a second entity public key; and
    wherein the enforcement computing system, in response to subscribing to a second ICN message, the second ICN message including the second entity name defined in the ICN hierarchical namespace:
        determines, from the second ICN message, a target identifier and an action identifier of the second ICN message, wherein the target identifier of the second ICN message corresponds to the NEPGLSR; and
        determines whether the second entity, associated with the second entity name, is authorized to perform an action, corresponding to the action identifier of the second ICN message, on the NEPGLSR, based on the maintained authorization information.

2. The method of claim 1, wherein the second ICN message is cryptographically signed based on a private key associated with the second entity, and wherein in response to subscribing to the second ICN message the enforcement computing system further:
    validates, based on the cryptographically signed second ICN message and the second entity public key, that the second ICN message was published by the second entity and that the second ICN message was not altered after it the second ICN message was cryptographically signed.

3. The method of claim 2, wherein the certificate associated with the second entity has a cryptographic signing chain including a trust anchor key, and wherein in response to subscribing to the second ICN message the enforcement computing system further:
    determines, based on the cryptographically signed second ICN message and the second entity public key, that the second entity is authorized by the trust anchor key.

4. The method of claim 1, wherein the first ICN message is generated based on at least two trust rules selected from the plurality of trust rules.

5. The method of claim 1, wherein the origin identifier and the target identifier of the second ICN message are each defined in the ICN hierarchical namespace.

6. The method of claim 1, wherein the first ICN message and the certificate associated with the second entity have a signing chain with a common trust anchor key, and wherein determining whether the second entity is authorized to perform the action of the second ICN message is based further on validating the first ICN message and the certificate with a trust anchor certificate.

7. The method of claim 1, further comprising:
    publishing a third ICN message, associated with the same target identifier as the first ICN message, wherein the third ICN message characterizes actions permitted to be performed by a third entity on the NEPGLSR.

8. The method of claim 1, wherein at least one trust rule of the plurality of trust rules further comprises a condition.

9. The method of claim 8, wherein the condition of the at least one trust rule specifies a window of time during which an entity associated with the origin identifier of the at least one trust rule can perform an action, based on the action identifier of the trust rule, on an entity associated with the target identifier of the at least one trust rule.

10. The method of claim 8, wherein the condition of the at least one trust rule specifies a status, and wherein an entity associated with the origin identifier of the at least one trust rule can perform an action on an entity associated with the target identifier of the at least one trust rule, when a status associated with the entity associated with the target identifier of the at least one trust rule matches the at least one trust rule status.

11. The method of claim 10, wherein the at least one trust rule status is one of normal operation, maintenance operation, or emergency operation.

12. The method of claim 1, wherein the second ICN message comprises a software image, and wherein determining that the second entity is allowed to perform the action corresponding to the action identifier of the second ICN message causes software associated with the NEPGLSR to be updated based on the software image.

13. The method of claim 1, wherein the target identifier of at least one trust rule is associated with a plurality of solar cells.

14. The method of claim 1, wherein the origin identifier of at least one trust rule is a user associated with an infrastructure provider, a user associated with a NEPGLSR vendor, or an end-user.

15. The method of claim 1, wherein the communication channel over which the second ICN message is published utilizes Institute of Electrical and Electronics Engineers (IEEE) 2030.5, Distributed Network Protocol 3 (DNP3), modbus, long range (LoRa) mesh communication, or Transmission Control Protocol/Internet Protocol (TCP/IP).

16. The method of claim 1, wherein the first entity corresponds to the origin identifier of the selected trust rule.

17. The method of claim 1, wherein the first entity corresponds to the target identifier of the selected trust rule.

* * * * *